United States Patent
Ko et al.

(10) Patent No.: US 11,659,165 B2
(45) Date of Patent: May 23, 2023

(54) VIDEO CODING DEVICE AND METHOD USING DETERMINED INTRA PREDICTION MODE BASED ON UPPER BOUNDARY

(71) Applicant: HUMAX CO., LTD., Gyeonggi-do (KR)

(72) Inventors: Geonjung Ko, Seoul (KR); Juhyung Son, Gyeonggi-do (KR); Dongcheol Kim, Gyeonggi-do (KR); Jaehong Jung, Seoul (KR); Jinsam Kwak, Gyeonggi-do (KR)

(73) Assignee: HUMAX CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/412,212

(22) Filed: Aug. 25, 2021

(65) Prior Publication Data
US 2021/0385441 A1 Dec. 9, 2021

Related U.S. Application Data

(63) Continuation of application No. 16/907,081, filed on Jun. 19, 2020, now Pat. No. 11,140,384, which is a
(Continued)

(30) Foreign Application Priority Data

Dec. 22, 2017 (KR) .................. 10-2017-0178796
Dec. 22, 2017 (KR) .................. 10-2017-0178884
Mar. 26, 2018 (KR) .................. 10-2018-0034742

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176; H04N 19/11; H04N 19/593; H04N 19/70
(Continued)

(56) References Cited

U.S. PATENT DOCUMENTS

2010/0027655 A1   2/2010   Matsuo
2013/0128961 A1*  5/2013   Kim ............... H04N 19/117
                                                   375/240.03
(Continued)

FOREIGN PATENT DOCUMENTS

JP    2013-141187    7/2013
KR    10-2009-0110336    10/2009
(Continued)

OTHER PUBLICATIONS

International Search Report for PCT/KR2018/016604 dated Apr. 16, 2019 and its English translation from WIPO (now published as WO 2019/125093).
(Continued)

*Primary Examiner* — Marnie A Matt
(74) *Attorney, Agent, or Firm* — Ladas & Parry, LLP

(57) ABSTRACT

A video signal processing method and device for encoding or decoding a video signal may perform operations of determining whether a coding tree block is divided into a plurality of blocks; determining whether an upper boundary of a current block is adjacent to an upper boundary of the coding tree block, determining a first intra prediction mode for prediction of the current block based on whether the upper boundary of the current block is adjacent to the upper
(Continued)

boundary of the coding tree block, reconstructing the current block based on the first intra prediction mode.

15 Claims, 23 Drawing Sheets

Related U.S. Application Data continuation of application No. PCT/KR2018/016604, filed on Dec. 24, 2018.

(51) Int. Cl.
*H04N 19/159* (2014.01)
*H04N 19/176* (2014.01)

(58) Field of Classification Search
USPC .................................................. 375/240.02
See application file for complete search history.

(56) References Cited

U.S. PATENT DOCUMENTS

| | | | |
|---|---|---|---|
| 2013/0136178 A1 | 5/2013 | Sasai | |
| 2013/0230104 A1 | 9/2013 | Song | |
| 2014/0376634 A1 | 12/2014 | Guo et al. | |
| 2016/0295237 A1* | 10/2016 | Piao | H04N 19/463 |
| 2016/0309184 A1 | 10/2016 | Choe | |
| 2017/0013269 A1* | 1/2017 | Kim | H04N 19/174 |
| 2017/0347102 A1 | 11/2017 | Panusopone | |
| 2017/0347103 A1 | 11/2017 | Yu | |
| 2018/0367793 A1* | 12/2018 | Park | H04N 19/11 |
| 2019/0116381 A1 | 4/2019 | Lee | |
| 2019/0222837 A1* | 7/2019 | Lee | H04N 19/146 |
| 2019/0289301 A1* | 9/2019 | Lim | H04N 19/107 |
| 2020/0077089 A1* | 3/2020 | Lee | H04N 19/70 |
| 2020/0413069 A1* | 12/2020 | Lim | H04N 19/593 |
| 2021/0344955 A1* | 11/2021 | Lim | H04N 19/117 |

FOREIGN PATENT DOCUMENTS

| | | |
|---|---|---|
| KR | 10-2012-0025174 | 3/2012 |
| KR | 10-2017-0065668 | 6/2017 |
| WO | 2017/084577 | 5/2017 |
| WO | 2017/176030 | 10/2017 |
| WO | 2017/205703 | 11/2017 |
| WO | 2019/125093 | 6/2019 |

OTHER PUBLICATIONS

Written Opinion of the International Searching Authority for PCT/KR2018/016604 dated Apr. 16, 2019 and its English translation from WIPO (now published as WO 2019/125093).
Li, Jiahao et al., Multiple line-based intra prediction, May 26-Jun. 1, 2016, Joint Video Exploration Team (JVET) of ITU-T SG 16 WP 3 and ISO/IEC JTC 1/SC 29/WG 11, $3^{rd}$ Meeting: Geneva, CH, Document: JVET-C0071 (Year: 2016).
Chang, Yao-Jen et al., Arbitrary reference tier for Intra directional modes, May 26-Jun. 1, 2016, Joint Video Exploration Team (JVET) of ITU-T SG 16 WP 3 and ISO/IEC JTC 1/SC 29/WG 11, $3^{rd}$ Meeting: Geneva, CH, Document: JVET C0043 (Year: 2016).
Zhang, Kai et al., Enhanced Cross-component Linear Model Intra-prediction, Jan. 12-20, 2017, Joint Video Exploration Team (JVET) of ITU-T SG 16 WP 3 and ISO/IEC JTC 1/SC 29/WG 11, $5^{th}$ Meeting: Geneva, CH, Document: JVET E0077 (Year: 2017).
Non Final Office Action for U.S. Appl. No. 16/907,081 dated Mar. 18, 2021 (now published as US 2020/0322601).
Notice of Allowance for U.S. Appl. No. 16/907,081 dated May 25, 2021 (now published as US 2020/0322601).
Office Action dated May 10, 2022 for Korean Patent Application No. 10-2018-0168748 and its English translation provided by Applicant's foreign counsel.
Hui-Yu Jiang et al.: "CE3-related: Advanced MPM based on intra reference line selection scheme", Joint Video Experts Team (JVET) of ITU-T SG16 WP 3 and ISO/IEC JTC 1/SC 29/WG 11, JVET-K0175, $11^{th}$ Meeting, Ljubljana, SI, Jul. 10-18, 2018, pp. 1-6.
Office Action dated Nov. 10, 2021 for Indian Patent Application No. 202027029023.
Office Action dated Jan. 21, 2022 for Korean Patent Application No. 10-2018-0168748 and its English translation provided by Applicant's foreign counsel.
Office Action dated Aug. 26, 2022 for Korean Patent Application No. 10-2018-0168748 and its English translation provided by Applicant's foreign counsel.
Decision to Reject the Amendments dated Aug. 26, 2022 for Korean Patent Application No. 10-2018-0168748 and its English translation provided by Applicant's foreign counsel.
Notice of Allowance dated Feb. 10, 2023 for Chinese Patent Application No. 201880083011,7 and its English translation provided by Applicant's foreign counsel.
Office Action dated Feb. 24, 2023 for Indian Patent Application No. 202228029824.

* cited by examiner

VIDEO CODING DEVICE AND METHOD USING DETERMINED INTRA PREDICTION MODE BASED ON UPPER BOUNDARY

CROSS-REFERENCE TO RELATED APPLICATIONS

This application is a continuation of U.S. application Ser. No. 16/907,081 filed on Jun. 19, 2020, which is a continuation of International Patent Application No. PCT/KR2018/016604 filed on Dec. 24, 2018, which claims the priority to Korean Patent Application No. 10-2017-0178796 filed in the Korean Intellectual Property Office on Dec. 22, 2017, Korean Patent Application No. 10-2017-0178884 filed in the Korean Intellectual Property Office on Dec. 22, 2017 and Korean Patent Application No. 10-2018-0034742 filed in the Korean Intellectual Property Office on Mar. 26, 2018, the entire contents of which are incorporated herein by reference.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

The present invention has an object to increase the coding efficiency of a video signal. In addition, the present invention has an object to increase signaling efficiency related to prediction of the current block using reference samples of the current block.

Technical Solution

In order to solve the above problems, the present invention provides the following video signal processing device and video signal processing method.

First, according to an embodiment of the present invention, a method for processing a video signal comprises obtaining reference line information indicating a reference line used for intra prediction of a current block among a plurality of reference lines configured with neighboring samples of the current block, determining an intra prediction mode for the current block among a plurality of intra prediction modes configuring an intra prediction mode set based on the reference line information, and decoding the current block based on a plurality of reference samples on a reference line according to the reference line information and the determined intra prediction mode, wherein the plurality of reference lines include a first reference line configured with neighboring samples on a line adjacent to the boundary of the current block, and a second reference line configured with neighboring samples on a line spaced by a specific number of samples based on the boundary of the current block.

Furthermore, according to an embodiment of the present invention, a video signal processing device includes a processor, wherein the processor is configured to obtain reference line information indicating a reference line used for intra prediction of a current block among a plurality of reference lines configured with neighboring samples of the current block, determine an intra prediction mode for the current block among a plurality of intra prediction modes configuring an intra prediction mode set based on the reference line information, and decode the current block based on a plurality of reference samples on a reference line according to the reference line information and the determined intra prediction mode, wherein the plurality of reference lines may include a first reference line configured with neighboring samples on a line adjacent to the boundary of the current block, and a second reference line configured with neighboring samples on a line spaced by a specific number of samples based on the boundary of the current block.

When the reference line for intra prediction of the current block is the first reference line, the intra prediction mode set may be a first intra prediction mode set, wherein when the reference line for intra prediction of the current block is not the first reference line, the intra prediction mode set may be a second intra prediction mode set configured with part of a plurality of intra prediction modes configuring the first intra prediction mode set.

The second intra prediction mode set may be configured with a plurality of angular modes.

The second intra prediction mode set may be configured with a preset number of angular modes determined based on an intra prediction mode corresponding to any one of neighboring blocks of the current block.

The processor may receive intra prediction mode information indicating any one of a preset number of angular modes included in the second intra prediction mode set, and determine an intra prediction mode for the current block based on the intra prediction mode information.

The intra prediction mode set may be determined based on a relative position of the current block in an upper level region of the current block.

The processor may configure the intra prediction mode set for the current block according to the relative position of the current block in the upper level region.

When the current block is adjacent to an upper boundary of the upper level region, the reference line information may be considered to indicate the first reference line, wherein the intra prediction mode set for the current block may be the first intra prediction mode set.

The first intra prediction mode set may include a plurality of angular modes, a planar mode, and a direct current mode (DC mode).

The boundary of the current block may be a left or upper boundary of the current block.

The specific number of samples may be less than or equal to a preset number of samples.

Advantageous Effects

According to an embodiment of the present invention, coding efficiency of a video signal may be increased. In addition, according to an embodiment of the present invention, signaling efficiency related to intra prediction of a current block may be increased.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
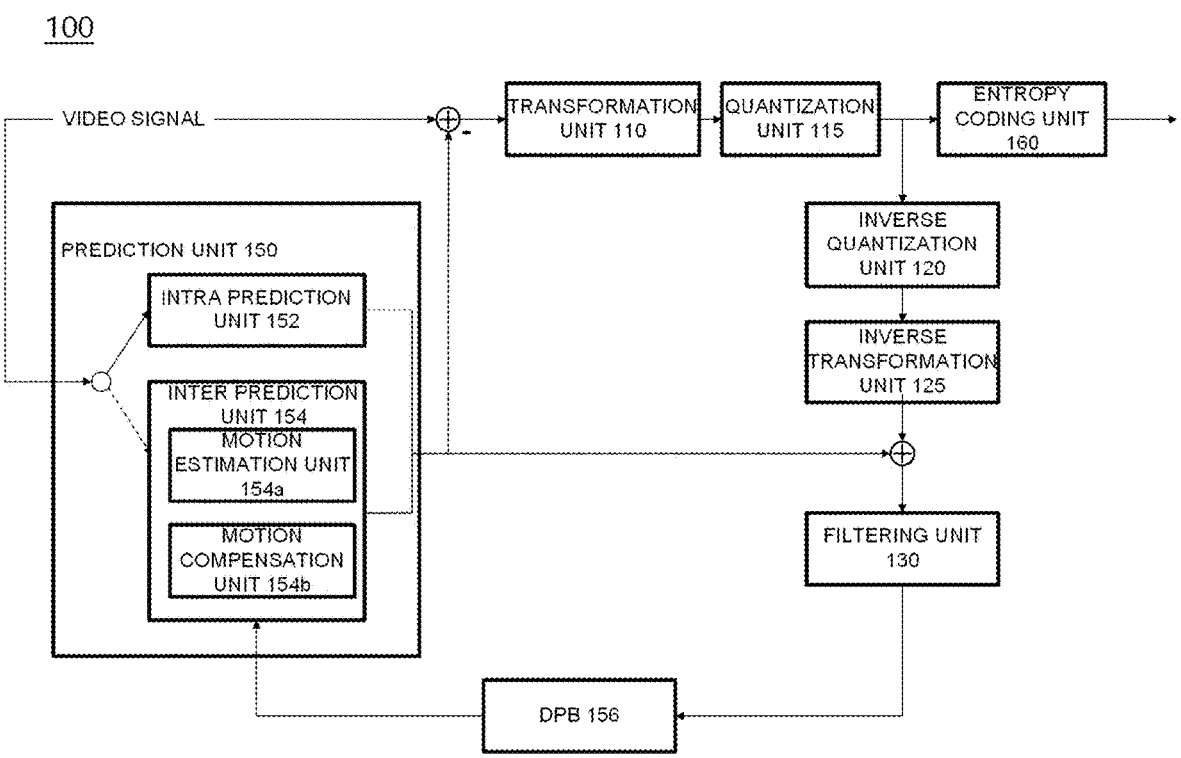
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information on a reference region to the entropy coding unit 160.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
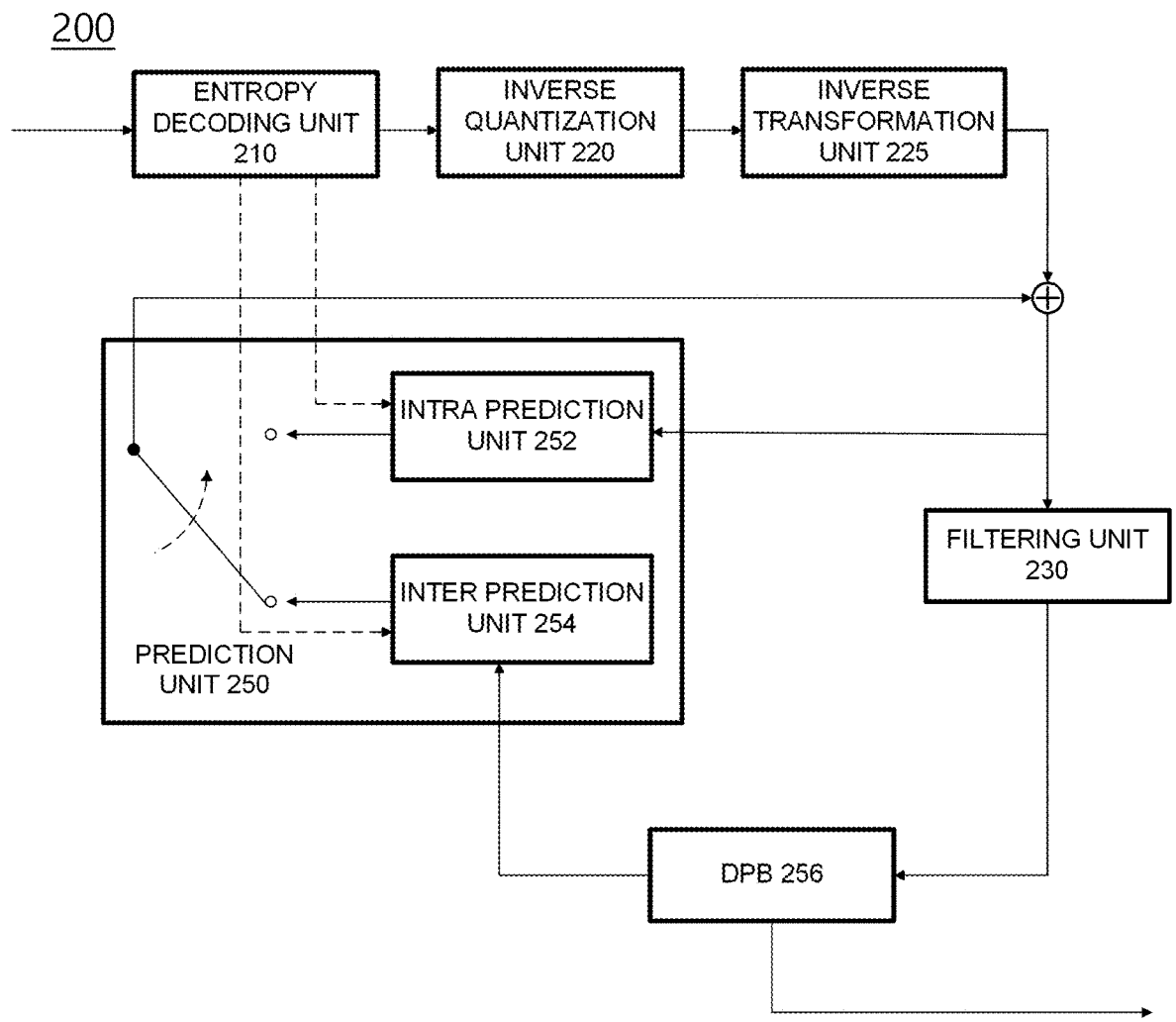
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream, and extracts transform coefficients, intra encoding information, and inter encoding information for each region. The inverse quantization unit 220 inverse-quantizes the entropy decoded transform coefficient, and the inverse transformation unit 225 reconstructs the residual value using the inverse quantized transform coefficient. The video signal processing apparatus 200 reconstructs the original pixel value by adding the residual value obtained in the inverse transformation unit 225 and the prediction value obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction, is called an intra picture or an I picture (or, tile/slice), and a picture (or, tile/slice) that can perform both intra prediction and inter prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and restored samples in the current picture. As described above, the intra encoding information may include at least one of an intra prediction mode, a Most Probable Mode (MPM) flag, and an MPM index. The intra prediction unit 252 predicts the sample values of the current block by using the restored samples located on the left and/or upper side of the current block as reference samples. In this disclosure, restored samples, reference samples, and samples of the current block may represent pixels. Also, sample values may represent pixel values.

According to an embodiment, the reference samples may be samples included in a neighboring block of the current block. For example, the reference samples may be samples adjacent to the left boundary of the current block and/or samples adjacent to the upper boundary. Also, the reference samples may be samples and/or located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a pixel value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously using motion information.

The reconstructed video picture is generated by adding the prediction value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
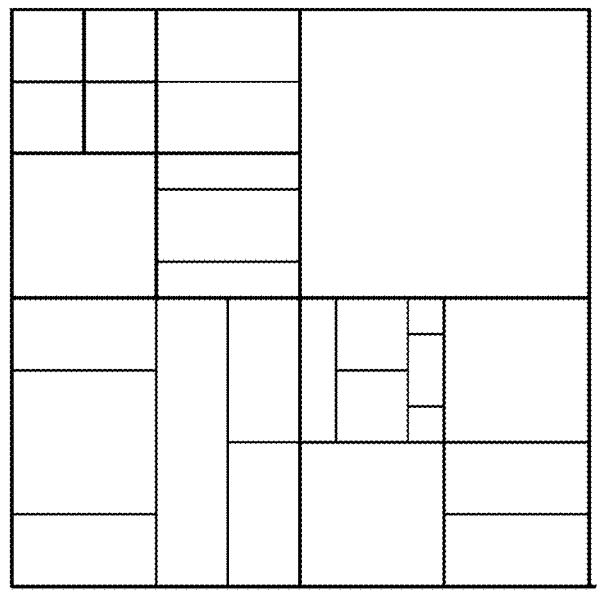
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If the coding unit is not too large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size, 8) Maximum QT depth (MaxQtDepth): The maximum number of QT splits allowed.

Figure 4:
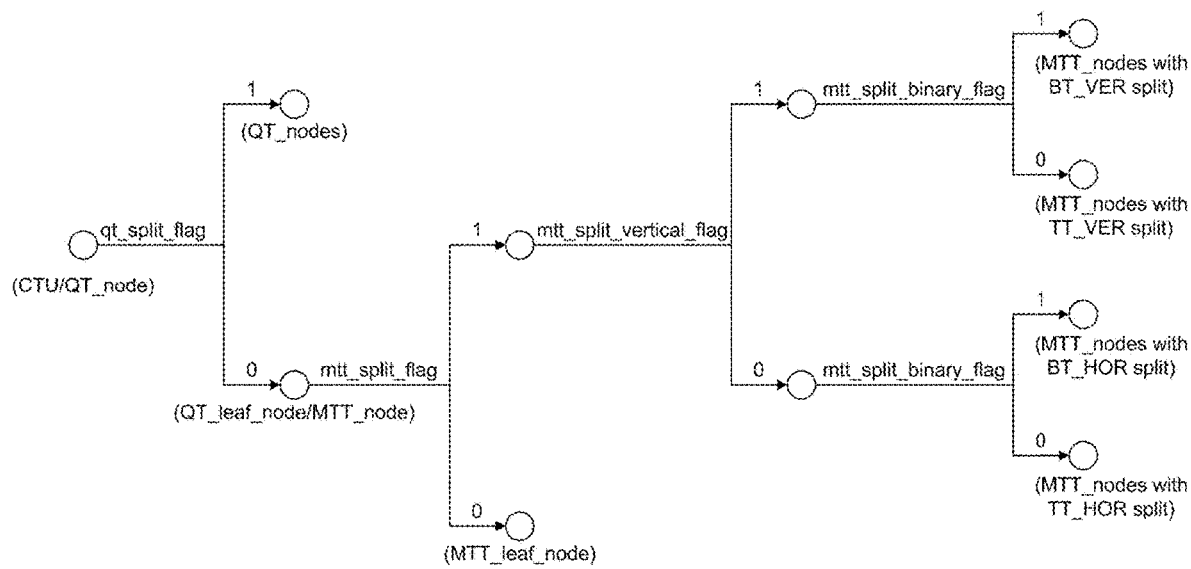
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Figure 5:
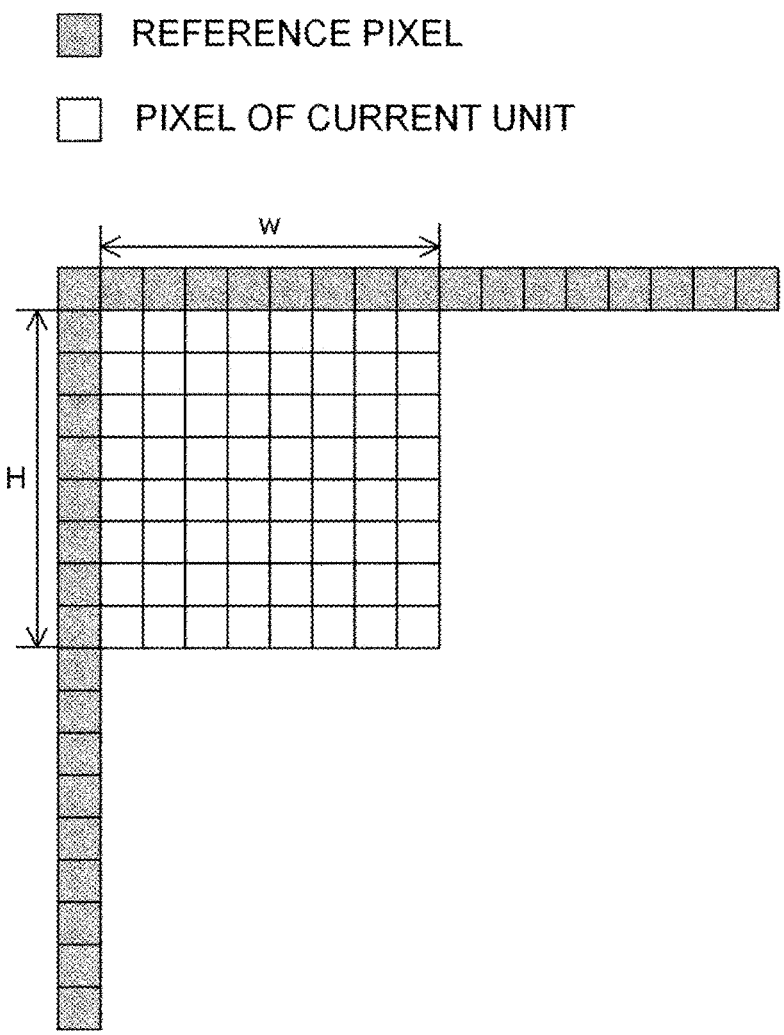
FIG. 5 shows an embodiment of reference samples used for prediction of a current block in an intra prediction mode.
Figure 6:
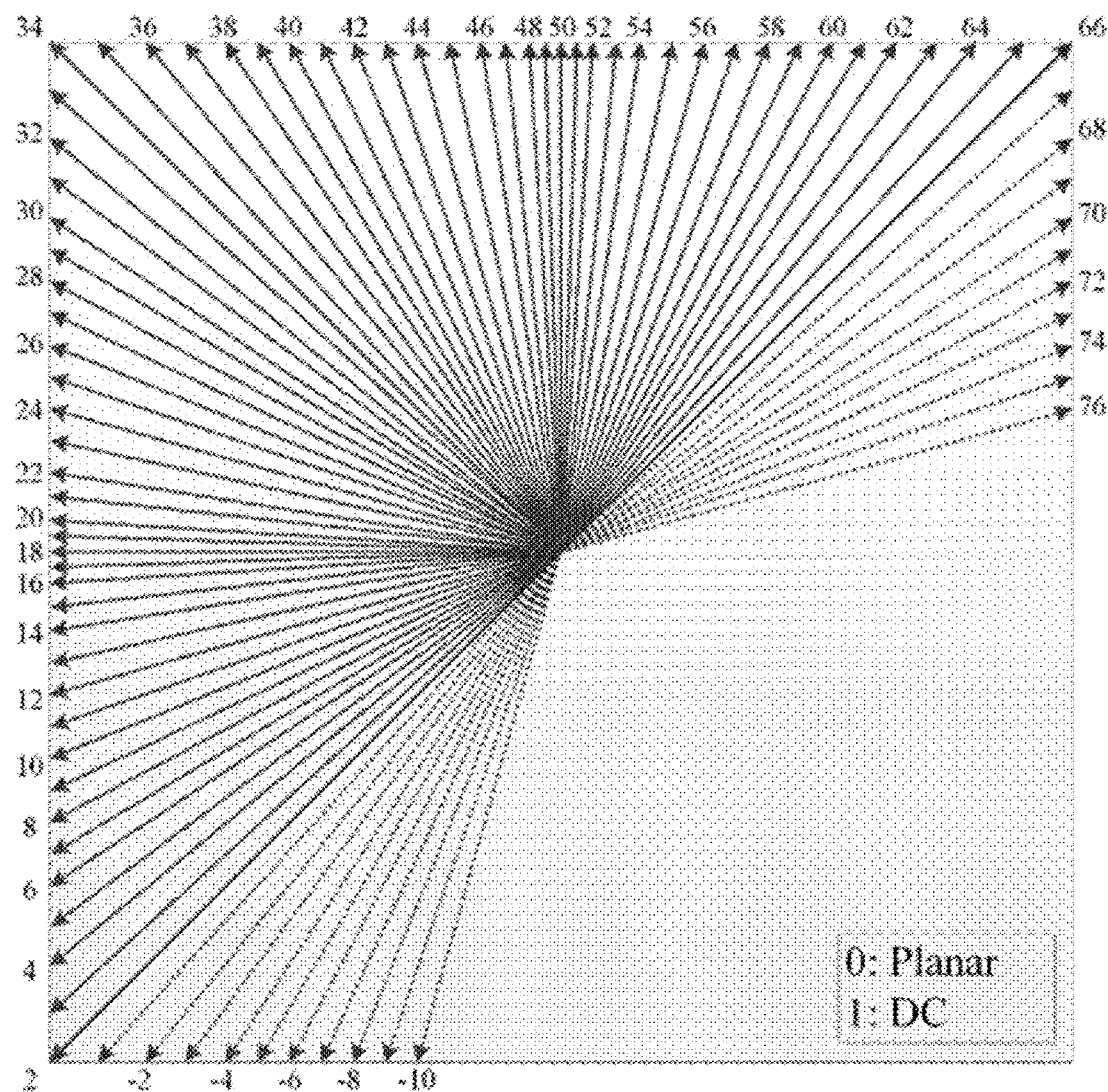
FIG. 6 shows an embodiment of prediction modes used for intra prediction.

FIGS. 5 and 6 more specifically illustrate an intra prediction method according to an embodiment of the present invention. As described above, the intra prediction unit predicts the sample values of the current block by using the restored samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block. According to a further embodiment of the present invention, samples on a plurality of reference lines may be used for intra prediction of the current block. The plurality of reference lines may consist of n lines located within a predetermined distance from the boundary of the current block. In this case, separate reference line information indicating at least one reference line used for intra prediction of the current block may be signaled. Specifically, the reference line information may include an index indicating any one of a plurality of reference lines. In addition, if at least some of the samples to be used as reference samples have not been restored, the intra prediction unit may obtain a reference sample by performing a reference sample padding process. A method of padding a reference sample will be described in detail with reference to FIGS. 9 to 18. In addition, the intra prediction unit may perform a reference sample filtering process to reduce errors in intra prediction. That is, reference samples may be obtained by performing filtering on samples obtained by the neighboring samples and/or the reference sample padding process. The intra prediction unit predicts pixels of the current block using the reference pixels obtained in such a manner. In the present disclosure, neighboring samples may include samples on at least one reference line. For example, neighboring samples may include adjacent samples on a line adjacent to the boundary of the current block. Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). In some embodiments, the intra prediction mode set may consist of some of all intra prediction modes. Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently according to the shape of the current block. For example, when the current block is a rectangular block, a wide angle mode indicating an angle greater than 45 degrees or less than −135 degrees in the clockwise direction may be additionally used. When the current block is a horizontal block, the angle mode may indicate an angle within an angle range (i.e., a second angle range) between (45+offset1) degrees and (−135+offset1) degrees clockwise. In this case, angle modes 67 to 76 outside the first angle range may be additionally used. Also, when the current block is a vertical block, the angle mode may indicate an angle within an angle range (i.e., a third angle range) between (45−offset2) degrees and (−135−offset2) degrees clockwise. In this case, angle modes −10 to −1 outside the first angle range may be additionally used. According to an embodiment of the present invention, the values of offset1 and offset2 may be determined differently according to the ratio between the width and height of the rectangular block. Also, offset1 and offset2 may be positive numbers.

According to a further embodiment of the present invention, the plurality of angle modes included in the intra prediction mode set may include a basic angle mode and an extended angle mode. In this case, the extended angle mode may be determined based on the basic angle mode.

According to an embodiment, the basic angle mode is a mode corresponding to an angle used in intra prediction of an existing High Efficiency Video Coding (HEVC) standard, and the extended angle mode may be a mode corresponding to a newly added angle in intra prediction of the next generation video codec standard. More specifically, the basic angle mode is an angle mode corresponding to any one of intra prediction modes {2, 4, 6, . . . , 66} and the extended angle mode is an angle mode corresponding to any one of intra prediction modes {3, 5, 7, . . . , 65}. That is, the extended angle mode may be an angle mode between basic angle modes within the first angle range. Accordingly, the angle indicated by the extended angle mode may be determined based on the angle indicated by the basic angle mode.

According to another embodiment, the basic angle mode may be a mode corresponding to an angle within a preset first angle range, and the extended angle mode may be a wide angle mode outside the first angle range. That is, the basic angle mode is an angle mode corresponding to any one of intra prediction modes {2, 3, 4, . . . , 66} and the extended angle mode is an angle mode corresponding to any one of intra prediction modes among {−10, −9, . . . , −1} and {67, 68, . . . , 76}. The angle indicated by the extended angle mode may be determined as an angle opposite to the angle indicated by the corresponding basic angle mode. Accordingly, the angle indicated by the extended angle mode may be determined based on the angle indicated by the basic angle mode. Meanwhile, the number of extended angle modes is not limited to this, and additional extension angles may be defined according to the size and/or shape of the current block. For example, the extended angle mode may be defined as an angle mode corresponding to any one of intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the above embodiments, the interval between the extended angle modes can be set based on the interval between the corresponding basic angle modes. For example, the interval between extended angle modes {3, 5, 7, . . . , 65} may be determined based on the interval between corresponding basic angle modes {2, 4, 6, . . . , 66}. For example, the interval between extended angle modes {−10, −9, . . . , −1} may be determined based on the interval between corresponding opposite-side basic angle modes {56, 57, . . . , 65}, and the interval between extended angle modes {67, 68, . . . , 76} may be determined based on the interval between corresponding opposite-side basic angle modes {3, 4, . . . , 12}. The angle interval between the extended angle modes can be configured to be the same as the angle interval between the corresponding basic angle modes. Also, the number of extended angle modes in the intra prediction mode set may be configured to be less than or equal to the number of basic angle modes.

According to an embodiment of the present invention, the extended angle mode may be signaled based on the basic angle mode. For example, the wide angle mode (i.e., extended angle mode) may replace at least one angle mode (i.e., basic angle mode) within the first angle range. The basic angle mode to be replaced may be an angle mode corresponding to the opposite side of the wide angle mode. That is, the basic angle mode to be replaced is an angle mode corresponding to an angle in the opposite direction of the angle indicated by the wide angle mode or an angle different from the angle in the opposite direction by a preset offset index. According to an embodiment of the present invention, the preset offset index is 1. The intra prediction mode index corresponding to the replaced basic angle mode may be mapped back to the wide angle mode to signal the wide angle mode. For example, the wide angle mode {−10, −9, . . . , −1} may be signaled by an intra prediction mode index {57, 58, . . . , 66}, and the wide angle mode {67, 68, . . . , 76} may be signaled by an intra prediction mode index {2, 3, . . . , 11}. In this way, as the intra prediction mode index for the basic angle mode signals the extended angle mode, even if the configuration of angle modes used for intra prediction of each block is different, the same set of intra prediction mode indexes can be used for signaling of the intra prediction mode. Accordingly, signaling overhead due to changes in intra prediction mode configuration can be minimized.

Meanwhile, whether to use the extended angle mode may be determined based on at least one of the shape and size of the current block. According to an embodiment, when the size of the current block is larger than a preset size, the extended angle mode may be used for intra prediction of the current block, and otherwise, only the basic angle mode may be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra prediction unit determines reference samples and/or interpolated reference samples to be used for intra prediction of the current block based on the intra prediction mode information of the current block. When the intra prediction mode index indicates a specific angular mode, a reference pixel or an interpolated reference pixel corresponding to the specific angle from the current pixel of the current block is used for prediction of the current pixel. Accordingly, different sets of reference samples and/or interpolated reference samples may be used for intra prediction according to the intra prediction mode. After intra prediction of the current block is performed using the reference samples and the intra prediction mode information, the decoder restores sample values of the current block by adding the residual signal of the current block obtained from the inverse transform unit to the intra prediction value of the current block.

Meanwhile, the encoder may signal the selected intra prediction mode information to the decoder. The decoder can extract intra prediction mode information of the current block from the bitstream. For example, when the total number of intra prediction modes constituting the intra prediction mode set is T (e.g., 67), since each mode does not consider the probability of selection and the context of the corresponding block and neighboring blocks, the method of signaling by expressing T modes simply in binary is inefficient. Therefore, an intra prediction mode set consisting of some modes associated with the current block among all modes may be separately managed. If the range of the intra prediction mode signaled is reduced, efficient signaling can be performed. For example, efficient signaling can be performed by separately managing a list of some modes that are most likely to be used in a current block among all modes.

Figure 7:
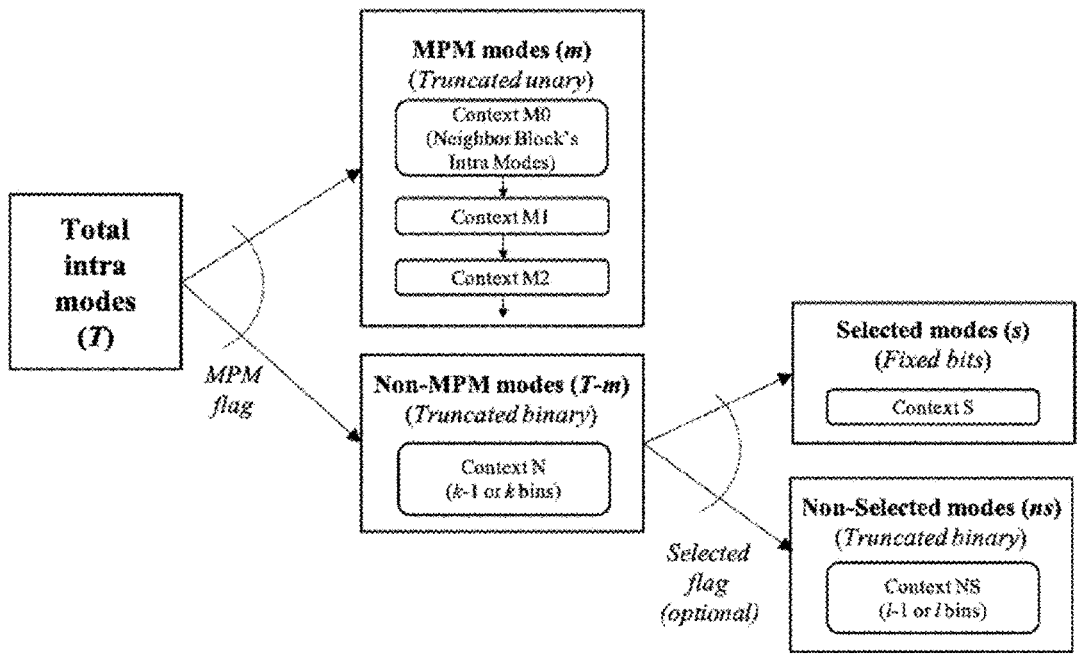
FIG. 7 shows an embodiment of a method of signaling an intra prediction mode selected by an encoder to a decoder.

FIG. 7 shows an embodiment of a method of signaling an intra prediction mode selected by an encoder to a decoder. According to an embodiment of the present invention, for intra prediction of a current block, a list of at least one prediction mode composed of some of the entire intra prediction modes may be managed. The first prediction mode list for intra prediction is a Most Probable Modes (MPM) list. The intra prediction mode included in the MPM list is the MPM mode, and the intra prediction mode not included in the MPM list may be referred to as a non-MPM mode. The encoder signals the MPM flag to distinguish whether the intra prediction mode used in the current block is an MPM mode or a non-MPM mode. The decoder may determine whether the intra prediction mode used in the current block is the MPM mode or the non-MPM mode through the received MPM flag.

According to an embodiment, efficient signaling can be performed with fewer bits by using a separate encoding method for the MPM mode. When m is the number of MPM modes included in the MPM list, the number of non-MPM modes is T-m. If the number m of MPM modes is less than the number T-m of non-MPM modes, the MPM mode may be coded with truncated unary binarization and the non-MPM mode may be coded with truncated binary binarization.

The MPM mode may be configured by considering various contexts by each step as follows. First, the MPM list may include intra prediction modes and plane/DC modes used in neighbor blocks of the current block (context M0). If an intra prediction mode-encoded block exists among reconstructed neighbor blocks, due to the regional similarity of pictures, it is possible that the current block uses the same intra prediction mode as that of the corresponding block. Accordingly, the MPM list may be configured including an intra prediction mode of neighbor blocks. According to an embodiment, the neighbor block of the current block may include at least one of the left (L) block, the above (A) block, the below left (BL) block, the above right (AR) block, or the above left (AL) block. For example, a neighbor block of the current block may include a left (L) block and an above (A) block neighboring to the current block. The left (L) block is the lowermost block neighboring to the left border of the current block, and the above (A) block is the rightmost block neighboring to the upper boundary of the current block. A detailed embodiment of neighbor blocks for configuring the MPM list will be described again with reference to FIG. 8. The intra prediction mode, planar mode, and DC mode selected from the neighbor blocks of the current block may be added to the MPM list according to a preset order. For example, the MPM list may be configured in the order of {block L mode, block A mode, planar mode, DC mode, block BL mode, block AR mode, block AL mode}.

Second, when m MPM modes are not filled by the above method, the MPM list may be filled by additionally applying additional context conditions (e.g., context M1, context M2, . . . ). When applying additional context conditions, the intra prediction mode already included in the MPM list may not be newly added.

Meanwhile, the remaining T-m non-MPM modes not included in the MPM list among the total T intra prediction modes may be coded by truncated binary binarization. When the truncated binary binarization is used, if it is assumed that $2^{(k-1)}<T-m<2^{(k)}$, the initial $2^{(k)}-(T-m)$ indices may be signaled using k−1 bits (or bins), and the remaining indices may be signaled using k bits (or bins). Therefore, additional context conditions (i.e., context N) are also applied to non-MPM modes to signal modes, which are more likely to be selected in the corresponding block, with an index composed of k−1 bits, so that signaling overhead can be minimized.

According to a further embodiment of the present invention, a second prediction mode list composed of some of the non-MPM modes may be managed. More specifically, the non-MPM modes may be additionally divided into a selected (s) mode and a non-selected (ns) mode, and a second prediction mode list composed of selected modes (i.e., a selected mode list) may be managed. The intra prediction mode included in the selected mode list may be referred to as a selected mode, and the intra prediction mode not included in the selected mode list may be referred to as a non-selected mode. The encoder may signal a selected mode flag to distinguish whether the intra prediction mode used in the current block is the selected mode or the non-selected mode. The decoder may identify whether the intra prediction mode used in the current block is the selected mode or the non-selected mode through a received selected mode flag.

When the non-MPM mode is additionally classified as described above, the selected mode may be coded with a fixed length. In this case, by applying an additional context condition (e.g., context S) to the selected modes, modes that are likely to be selected in the corresponding block may be preferentially arranged. In this case, s (in this case, s is a power of 2) selected modes may be coded with a fixed length, and the remaining ns non-selected modes may be coded with truncated binary binarization. The ns non-selected modes may be signaled using any 1-1 bits (or bins) or 1 bits (or bins). In this case, by applying an additional context condition (i.e., context NS) to the non-selected modes, signals that are relatively likely to be selected in the corresponding block are signaled with an index consisting of 1-1 bits, so that signaling overhead can be minimized.

A detailed embodiment of the context conditions will be described later with reference to the drawings. The context conditions that are further defined in the following embodiments may be individually or repeatedly applied to various configurations to which the context conditions {M0, M1, M2, N, S, NS} are applied. For example, a context condition for signaling the basic angle mode over the extended angle mode may be additionally used. In addition, the context conditions of first adding angle modes to a second prediction mode list by adding a predefined offset (e.g., −1, +1) to the angle mode of neighbor blocks derived through the first context condition (e.g., context M0) of the MPM mode an be used. This context condition may be applied as a context condition for one or more of MPM mode, non-MPM mode, selected mode, or non-selected mode. Meanwhile, the neighbor blocks of the current block under review to generate the variable MPM list may include blocks of additional positions in addition to the default position. A specific embodiment of this will be described with reference to FIG. 8.

Figure 8:
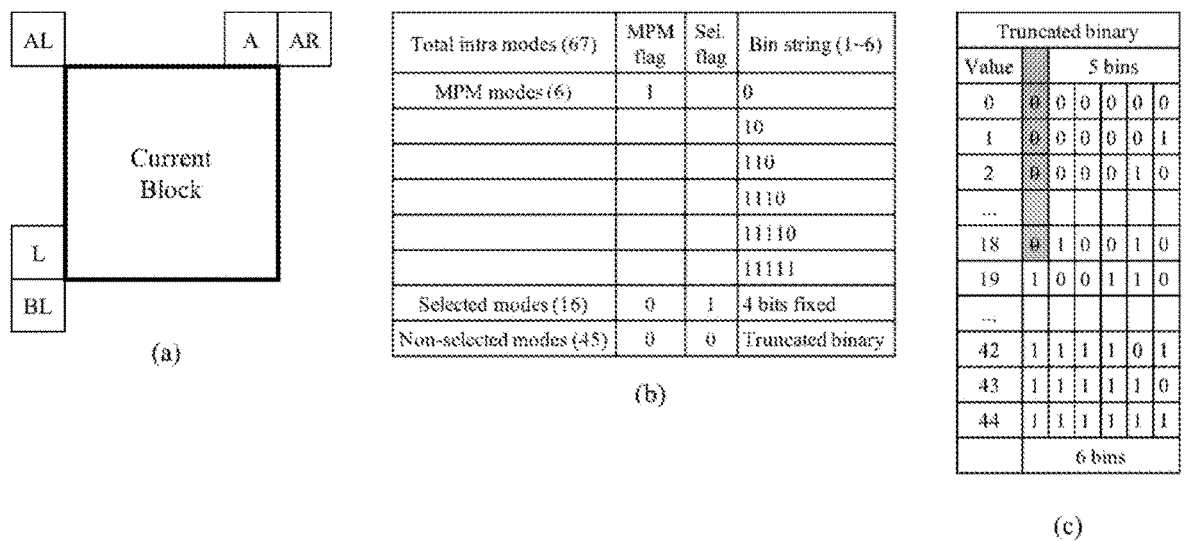
FIG. 8 shows a detailed embodiment of a method of signaling an intra prediction mode.

FIG. 8 shows a detailed embodiment of a method of signaling an intra prediction mode. FIG. 8(a) show embodiments of neighbor blocks referenced to configure a prediction mode list. FIG. 8(b) shows an embodiment of a method for signaling the intra prediction mode described above. In addition, FIG. 8(c) shows an embodiment of signaling non-selected modes with truncated binary binarization.

First, FIG. 8(a) shows an embodiment of relative positions of neighbor blocks referenced to configure an MPM list. Referring to FIG. 8(a), neighbor blocks are referenced in the order of the left (L) block, the above (A) block, the below left (BL) block, the above right (AR) block, or the above left (AL) block neighboring to the current block. In this case, the intra prediction mode, planar mode, and DC mode selected from the neighbor blocks may be added to the MPM list according to a preset order. However, in the embodiment of the present invention, neighbor blocks referenced to configure the MPM list are not limited thereto. For example, a neighbor block of the current block may include a left (L) block and an above (A) block neighboring to the current block. The left (L) block is the lowermost block neighboring to the left border of the current block, and the above (A) block is the rightmost block neighboring to the upper boundary of the current block.

According to an embodiment of the present invention, the order of configuring the MPM list may vary according to the shape of the current block. For example, when the current block is a non-square block, the reference order of neighboring blocks may be differently determined according to whether the current block is a vertical block or a horizontal block. For example, when the current block is a vertical block, the left block may be preferentially included in the MPM list over the upper block. When the current block is a horizontal block, the upper block may be preferentially included in the MPM list over the left block. According to an additional embodiment of the present invention, the order of configuring the MPM list may be determined by comparing the shape of the current block with the shape of a neighboring block. For example, if the current block is a vertical block, an intra prediction mode used for the vertical block among preset neighboring blocks may be preferentially included in the MPM list.

According to another embodiment of the present invention, the order of configuring the MPM list may be determined in consideration of the association between the shape of the current block and the angle mode used in the neighbor blocks. For example, if the current block is a vertical block, angle modes that are in a preset range from vertical (VER) mode 50 or between diagonal (DIA) mode 34 and vertical diagonal (VDIA) mode 66 among the angle modes used in preset neighbor blocks may be preferentially included in the MPM list. According to a further embodiment, intra prediction modes included in the MPM list of neighbor blocks may be included in the MPM list of the current block. In this case, when the MPM list of the current block is not filled with intra prediction modes used for neighbor blocks, intra prediction modes included in the MPM list of the neighbor blocks may be added to the MPM list of the current block.

According to a further embodiment of the present invention, depending on the size of the current block and the size of each of neighboring blocks, intra prediction modes of blocks at additional positions may be used. For example, when neighboring blocks of the current block are smaller than the size of the current block, a plurality of left blocks having different intra prediction modes may exist on the left side of the current block. Specifically, in FIG. 8(a), the left block represents a block located at the bottom of blocks adjacent to the left boundary of the current block, but may include another block adjacent to the left boundary of the current block. In this case, the MPM mode list may be configured based on the intra prediction mode corresponding to another block.

According to a further embodiment of the present invention, the MPM mode list of the current block may be configured based on the MPM mode list of neighboring blocks of the current block. For example, in addition to the intra prediction mode used for prediction of the left block in FIG. 8(a), the MPM mode list of the current block may be configured based on the additional intra prediction mode included in the MPM mode list of the left block.

FIG. 8(b) shows an embodiment of a method for signaling the intra prediction mode described above. Among the T intra prediction modes, m modes are divided into MPM modes and signaled with truncated unary binarization. According to an embodiment, T may be 67 and m may be 6. In truncated unary binarization, as the number of bits (or bins) used increases as the signaling index increases, signaling efficiency may be increased by matching modes that are more likely to be selected in a corresponding block to a low value index. For this, the encoder and decoder configure the MPM list with the same context condition, and the derived mode values may be rearranged based on the context condition and signaled. For example, CABAC-based encoding may be performed by classifying the selected modes in the order of non-angle mode, vertical mode, and plane angle mode such as DC/planar mode. Next, s selected modes determined by any context condition are signaled with fixed length bits, and the remaining ns non-selected modes are signaled with truncated binary binarization. According to an embodiment, n may be 16 and ns may be 45.

FIG. 8(c) shows an embodiment of signaling non-selected modes with truncated binary binarization. According to the above embodiment, the number ns of non-selected modes is 45. When truncated binary binarization is used, since $2^5<45<2^6$, the initial $2^6-45=19$ indices may be signaled using 5 bits (or bins), and the remaining 26 indices are signaled using 6 bits (or bins). Therefore, as a preset context condition is also applied to non-selected modes, modes that are more likely to be selected in a corresponding block may be matched to a low value index signaled by 5 bits (or bins). Specific embodiments of the preset context condition will be described with reference to the following drawings.

Moreover, at least some of the reference samples for intra prediction may not be available according to the scan order, the block partition, and the position of the current block. This is because, according to a restoration order of blocks in a picture, one or more non-restored reference samples that have not been restored may exist at a time point predicting a current block. Or, if it is necessary to refer to the outside of the picture boundary due to the location of the current block, at least some of the reference samples may not exist.

In the present disclosure, the case where the reference sample is not available includes the case where the reference sample has not been restored and the reference sample does not exist. If at least some reference samples are not available, reference sample padding may be performed. Hereinafter, padding methods according to an embodiment of the present invention will be described with reference to FIGS. 9 to 18.

Figure 9:
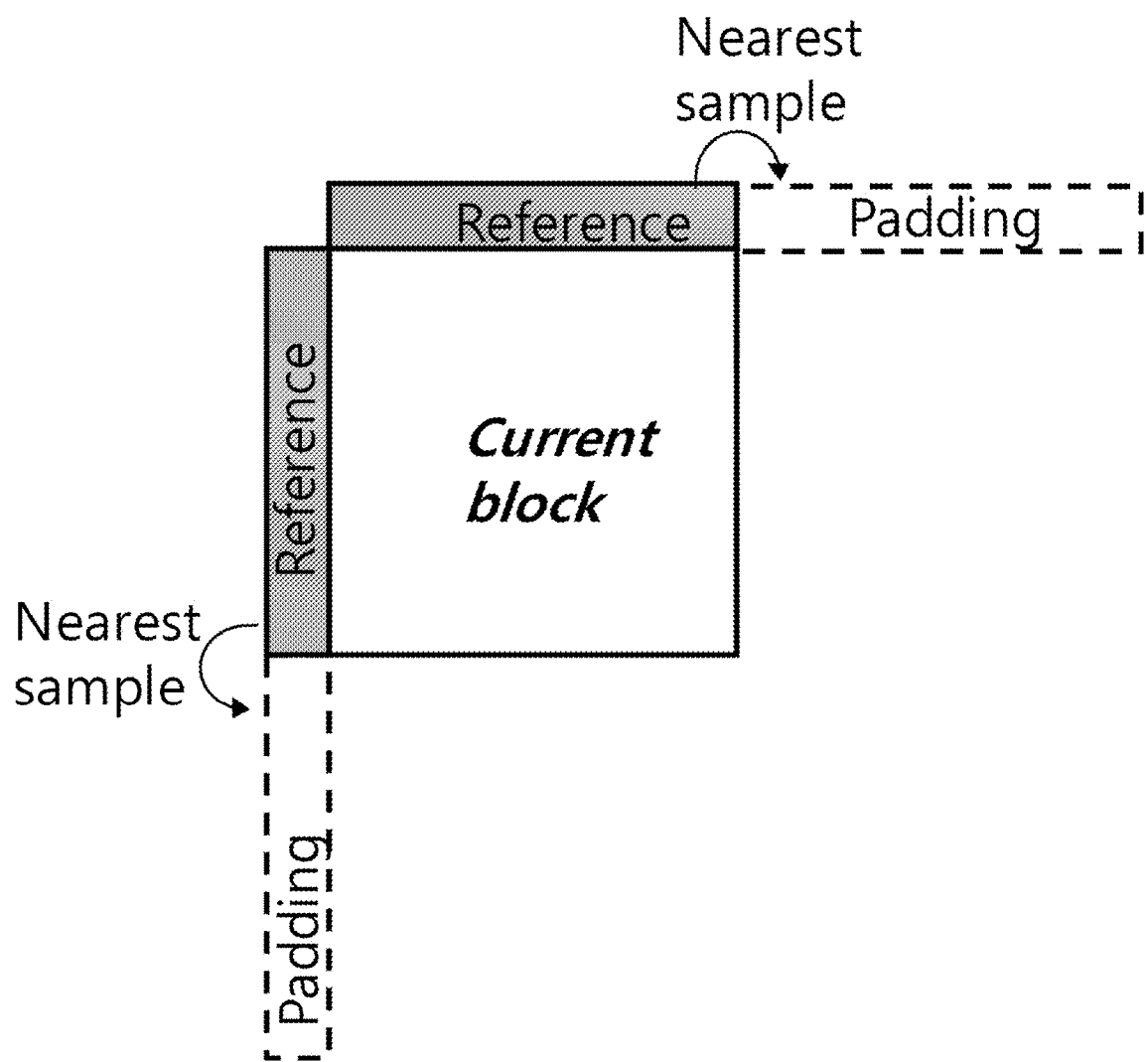
FIG. 9 is a diagram illustrating a reference sample padding method when some reference samples for intra prediction of a current block are not available.

FIG. 9 is a diagram illustrating a reference sample padding method when some reference samples for intra prediction of a current block are not available. As described above in FIG. 5, when at least some of the reference samples are not available, the decoder may replace an unavailable reference sample value with an available reference sample value by performing a reference sample padding process according to a preset rule. According to an embodiment, an unavailable reference sample value may be generated based on a reference sample closest to a distance from the unavailable reference sample among the available reference samples. For example, an unavailable reference sample value may be replaced with a reference sample value that is closest in distance to the unavailable reference sample.

Figure 10:
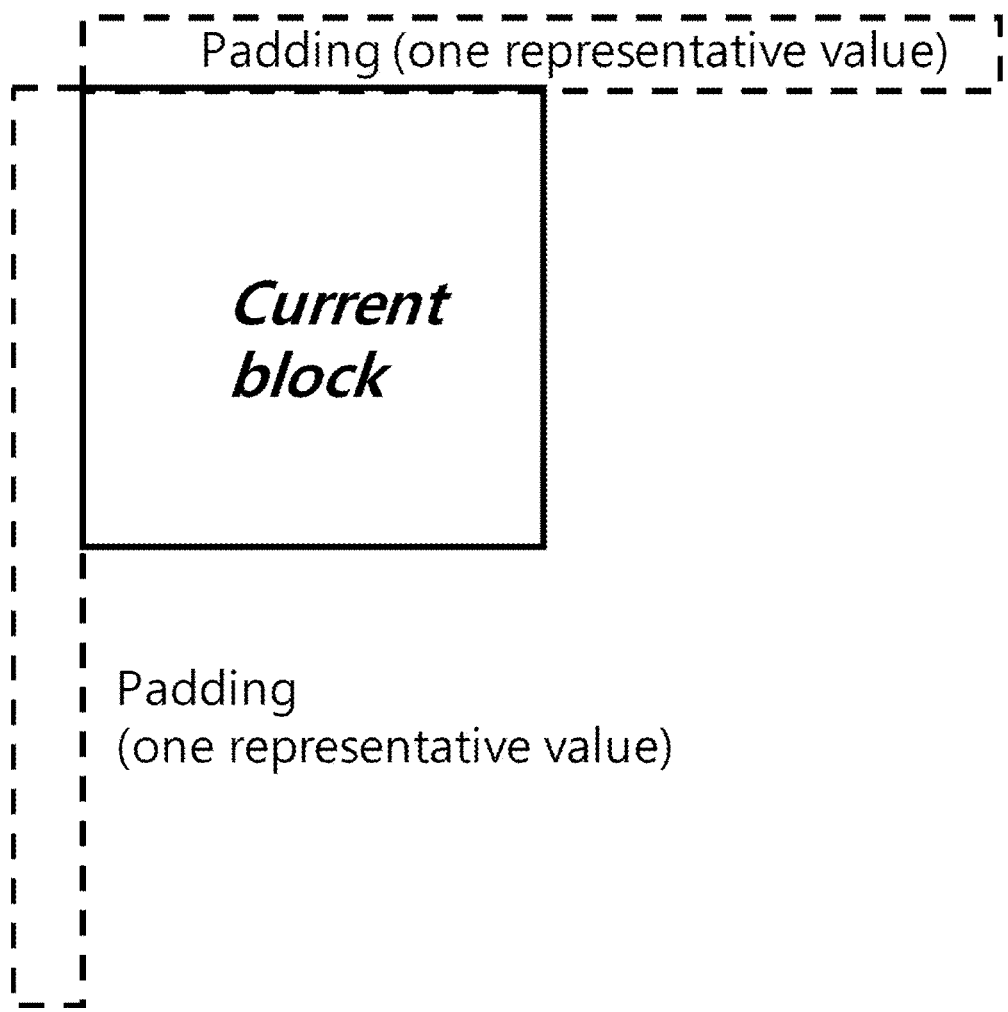
FIG. 10 is a diagram illustrating a reference sample padding method when all reference samples for intra prediction of a current block are not available.

FIG. 10 is a diagram illustrating a reference sample padding method when all reference samples for intra prediction of a current block are not available. For example, if the current block is adjacent to the upper left boundary of the picture, there may be no reference samples for the current block. In this case, reference sample padding may be performed based on the representative value. In this case, all of the padded reference samples may have the same value. According to an embodiment, the representative value may be set based on the bit depth of the sequence including the current block. For example, the representative value may be an intermediate value in a range that can be expressed based on bit depth.

According to another embodiment, the representative value may be set differently for each picture or sequence. For example, the representative value may be set based on sample values of a current picture including a current block, or a pre-restored picture or sequence restored before the current sequence. For example, the representative value may be any one of an average value, a mode value, or an intermediate value of sample values of a pre-restored picture or a sequence. Also, the representative value may be set based on the current picture or sample value(s) included in the current sequence. Specifically, when the sample value (s) restored before the current block exists in the current sequence or the current picture, the representative value may be any one of an average value, a mode value, or an intermediate value of the sample values previously restored.

Meanwhile, the reference samples may be split into left reference samples of the left boundary neighbor and upper reference samples of the upper boundary neighbor based on the boundary of the current block. According to a further embodiment of the present invention, different methods of reference sample padding may be performed on the left reference samples and the upper reference samples. For example, the first reference sample padding method may be performed on one side of the left reference samples and the upper reference samples, and the second reference sample padding method may be performed on the other side. For example, the first reference sample padding method may be the reference sample padding method described through FIG. 9, and the second reference sample padding method may be the reference sample padding method described through FIG. 10. For example, if there is a reference sample available to only one of the left reference samples and the upper reference samples, the reference sample padding described through FIG. 10 may be performed on the side where the available reference sample does not exist.

According to an embodiment of the present invention, reference sample padding may be performed in different ways according to a method in which a neighboring block is predicted. This is because the neighboring block of the current block may be predicted in a manner similar to that in which other neighboring blocks of the current block are predicted. According to an embodiment, when the neighboring block is predicted based on one of a plurality of intra prediction modes, reference sample padding may be performed based on the intra prediction mode of the neighboring block. For example, non-restored reference sample values may be determined based on available reference samples at a location determined based on the intra prediction mode of a neighboring block. According to another embodiment, when the neighboring block is inter predicted, reference sample padding may be performed based on information related to inter prediction. This will be described later with reference to FIGS. 16 to 18. The prediction performance for the current block may be improved due to the reference sample value determined based on the neighboring block prediction method.

Figure 11:
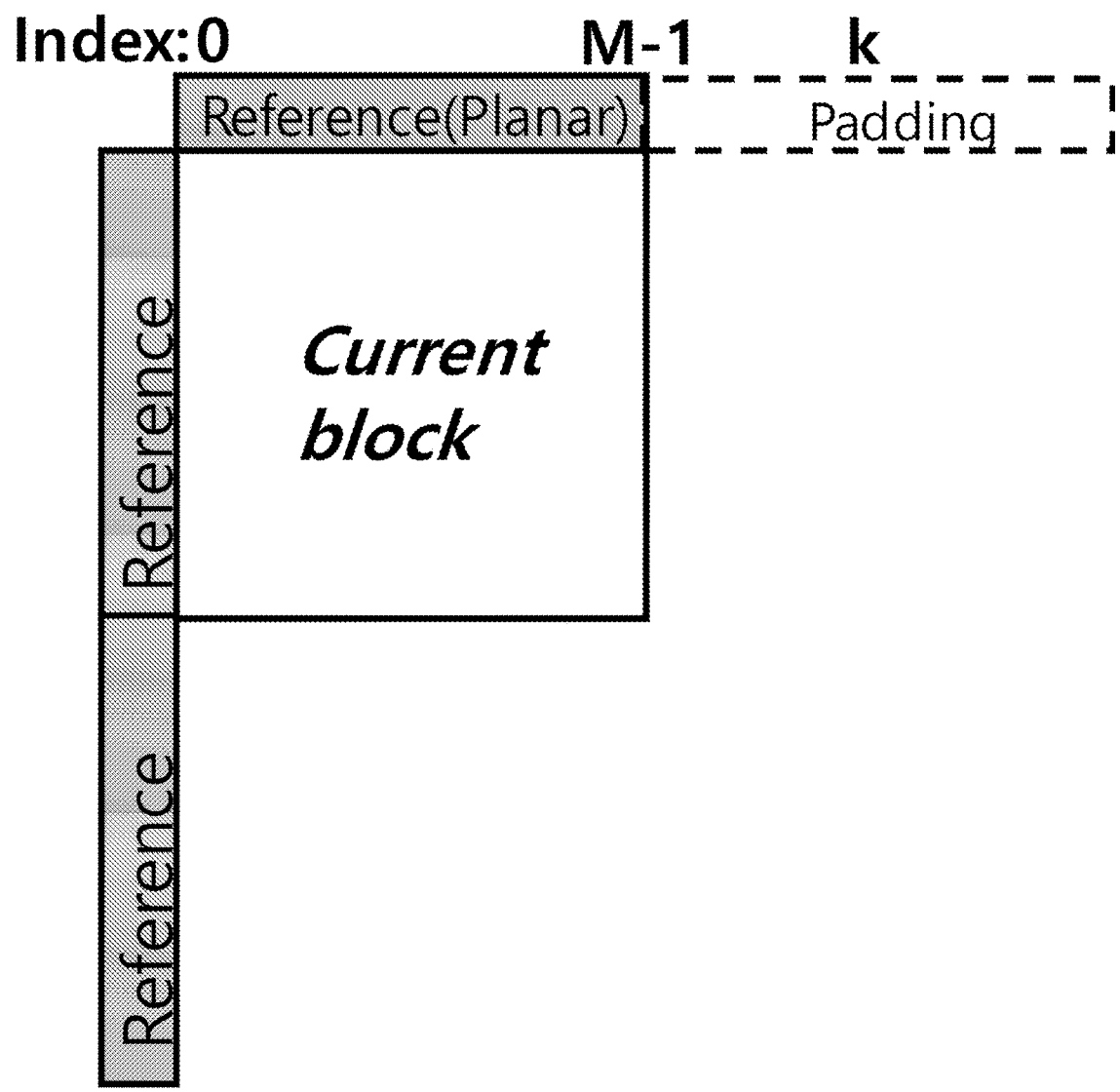
FIG. 11 is a diagram illustrating a reference sample padding method when a prediction mode of a neighboring block is a flat mode.

Hereinafter, a method of performing reference sample padding of the current block based on the intra prediction mode of the neighboring block will be described with reference to FIGS. 11 to 15. FIG. 11 is a diagram illustrating a reference sample padding method when a prediction mode of a neighboring block is a flat mode. Referring to FIG. 11, reference sample padding may be performed based on available reference samples. Also, the reference sample padding may be performed using the reference sample padded before the reference sample to be padded according to the positional padding order of the reference sample. The planar mode may be an intra prediction mode that is advantageous for representing blocks in which gradual changes in sample values occur. Accordingly, when at least one of the neighboring blocks of the current block is predicted using the planar mode, reference sample padding may be performed based on available reference samples located at a preset distance based on the reference sample to be padded. In this case, the reference sample padding method may be different from the method described in FIG. 9.

For example, the encoder and/or decoder may perform reference sample padding using a reference sample located at a predetermined distance based on a reference sample to be padded. The preset distance may be a sample unit distance. Specifically, an unavailable reference sample value may be determined based on the first reference sample and the second reference sample. For example, the first reference sample may be a reference sample located closest to the unavailable reference sample among the available reference samples of the first line to which the unavailable reference sample belongs. Also, the second reference sample may be a reference sample located at a distance from the unavailable reference sample by the number of available reference samples on the first line.

As in FIG. 11, when the unavailable reference sample is an upper reference sample, the first reference sample may be a sample adjacent to the left side of the unavailable reference sample. In this case, the second reference sample may be a sample that is separated by the number of M samples to the left from the unavailable reference sample. As in FIG. 11, when the unavailable reference sample is an upper reference sample, the first reference sample may be a sample adjacent to the left side of the unavailable reference sample. In this case, the second reference sample may be a sample separated by a specific number of samples upward from the unavailable reference sample.

Referring to FIG. 11, M consecutive reference samples among upper reference samples of the current block may be available. Also, a block including at least some of the M reference samples may be an intra-predicted neighboring block using a planar mode. When the index indicating the location of the M available reference samples is 0 to M−1, the k-th reference sample may not be available. In this case, k may be an integer greater than or equal to M. In this case, the k-th reference sample value (p[k]) may be determined based on the first reference sample value (p[k−1]) located closest to the left from the k-th reference sample and the second reference sample value (p[kM]) from the k-th reference sample by M to the left. In addition, the k-th reference sample value may be determined based on a change amount (p[k−1]−p[k−M]) between the first reference sample value and the second reference sample value. In this case, the k-th reference sample value p[k] may be expressed as the following Equation.

$$p[k]=p[k-1]+(p[k-1]-p[k-M])/(M-1)$$

or $$p[k]=p[k-1]+(p[k-1]-p[k-M])/M \quad \text{[Equation 1]}$$

Figure 14:
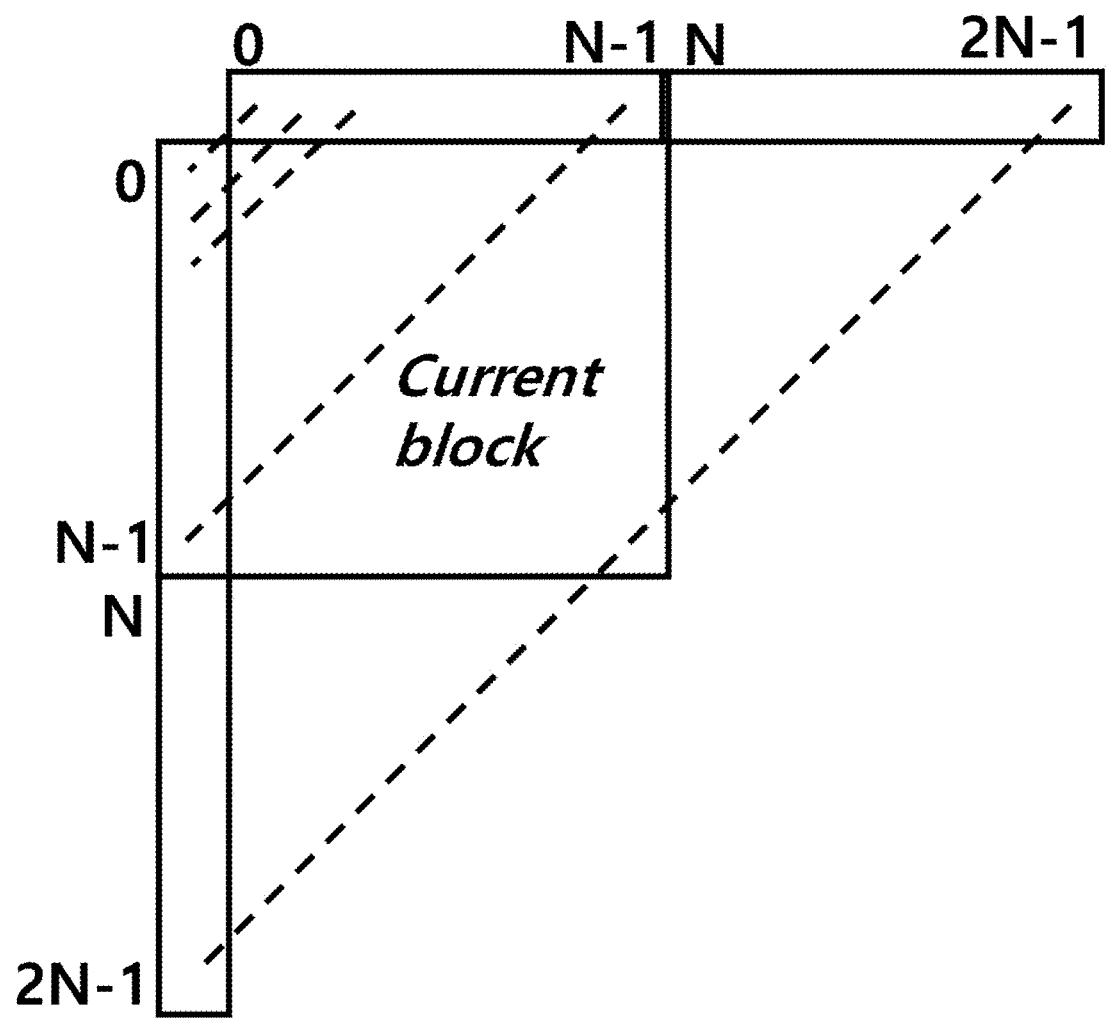
FIG. 14 is a diagram illustrating a reference sample padding method based on the location of reference samples.

According to another embodiment, an available reference sample value may be determined based on values of samples located at both ends of consecutive available reference samples. In FIG. 14, the k-th reference sample value is the leftmost third reference sample value (p[0]) and the rightmost fourth reference sample value (p[M−1]) among the available consecutive reference samples. Also, the k-th reference sample value may be padded based on the change amount between the third and fourth reference sample values. In this case, the k-th sample value may be expressed as Equation below.

$$p[k] = \quad \text{[Equation 2]}$$
$$p[M-1] + (k-M+1)*(p[M-1] - p[0])/(M-1) \text{ or }$$
$$p[k] = p[M-1] + (k-M+1)*(p[M-1] - p[0])/M$$

Equation 2 shows a method of determining the k-th reference sample value based on the fourth reference sample value and the change amount. In Equation 2, (k−M+1)/M or (k−M+1)/(M−1) may be weights for adjusting the degree of reflection of the change amount according to the location of the unavailable reference sample.

Figure 12:
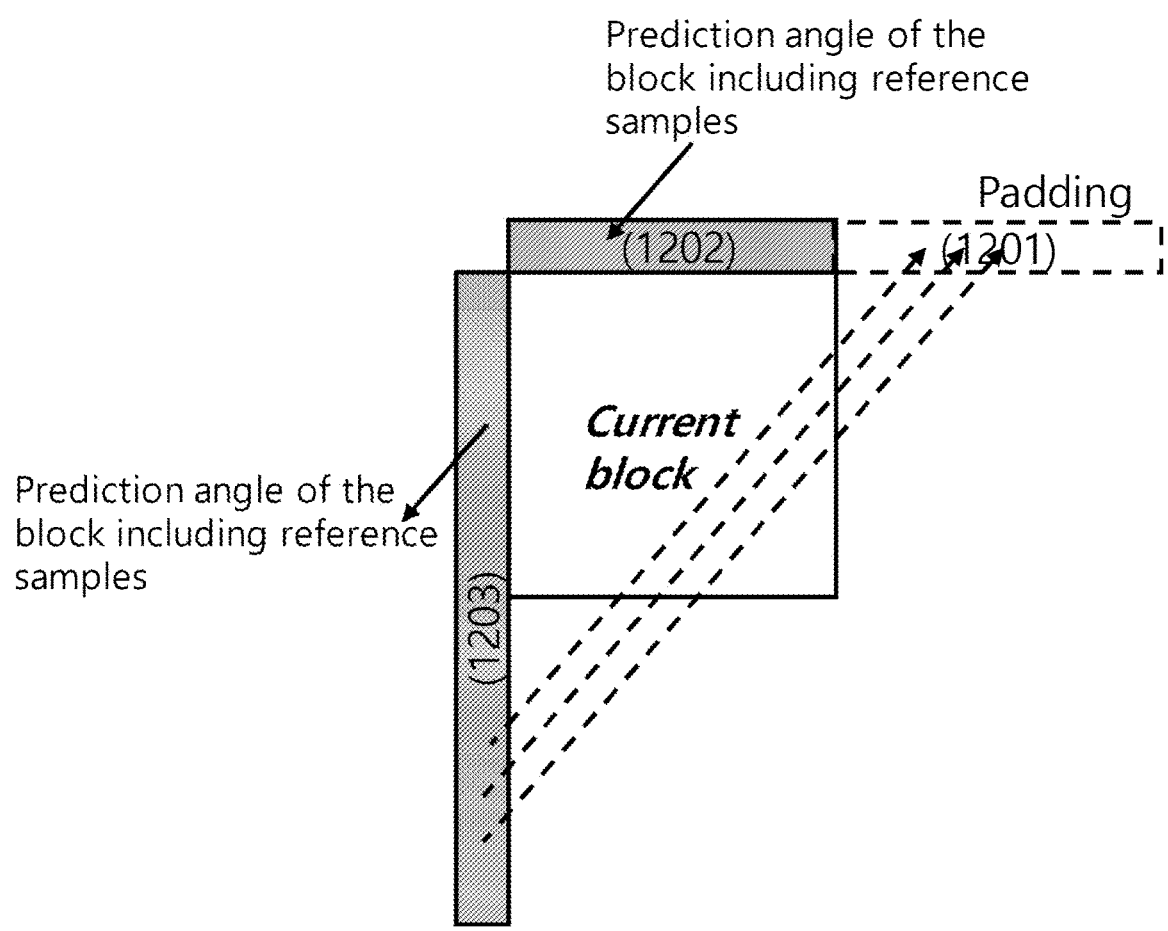
FIG. 12 is a diagram illustrating a reference sample padding method when a prediction mode of a neighboring block is an angular mode.

FIG. 12 is a diagram illustrating a reference sample padding method when a prediction mode of a neighboring block is an angular mode. According to an embodiment of the present disclosure, the unavailable reference sample value may be determined based on the angular mode of the neighboring block. For example, the unavailable reference sample value may be determined using a reference sample determined according to an angular mode of a neighboring block among available reference samples. In this case, values of unavailable reference samples among the reference samples included in the first group may be determined based on available reference samples among the reference samples included in the second group. For example, the first group may be configured with upper reference samples of the current block, and the second group may be configured with left reference samples of the current block.

Specifically, when the first group includes at least one unavailable reference sample, and the prediction mode of the neighboring block overlapping with the first group is the first angular mode, reference samples used for padding the first group of reference samples may be determined based on the first angular mode. The reference samples used for the first group of reference sample padding may be determined based on the prediction direction indicated by the first angular mode or the opposite direction. In this case, reference samples used for the first group of reference sample padding are included in the second group and may be available reference samples.

Referring to FIG. 12, unavailable reference samples 1201 may be samples of the first group. The intra prediction mode of the neighboring block including the first available reference samples 1202 among the samples of the first group may be a vertical diagonal mode. In this case, the value of unavailable reference samples 1201 may be determined based on second available reference samples 1203 included in the second group. Among the second available reference samples 1203, reference sample padding may be performed based on reference samples positioned in a prediction direction or a direction opposite to a vertical diagonal mode. The unavailable reference sample located on the horizontal diagonal with respect to the upper reference sample may be any one of the left reference samples.

Figure 13:
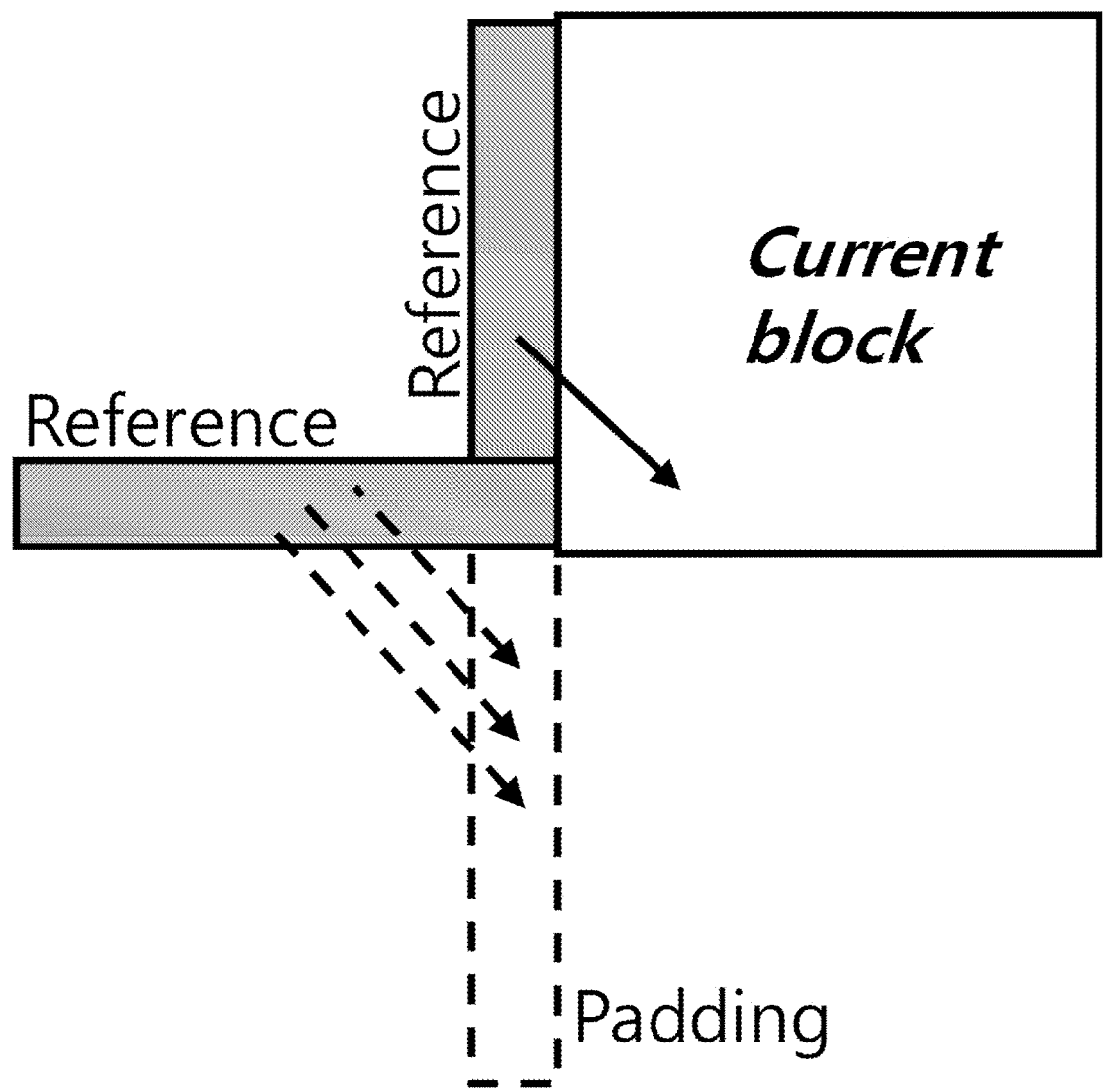
FIG. 13 is a diagram illustrating a reference sample padding method when a prediction mode of a neighboring block is an angular mode.

FIG. 13 is a diagram illustrating a reference sample padding method when a prediction mode of a neighboring block is an angular mode. As shown in FIG. 12, when the unavailable reference sample value is determined based on the angular mode, the distance between the location of the reference sample to be padded and the location of the reference sample used to pad may be greater than or equal to a preset value. As the distance between the sample locations is longer, the association between sample values may decrease.

Accordingly, according to an embodiment of the present invention, when the intra prediction mode of the neighboring block is the angular mode, the unavailable reference sample value may be determined based on a sample closest to the unavailable reference sample among restored samples on an angle indicated by the intra prediction mode of the neighboring block. In this case, the nearest sample may not be limited to the neighboring sample of the current block. Referring to FIG. 13, the unavailable reference sample value may be determined based on a first angle corresponding to an intra prediction mode of a neighboring block. The unavailable reference sample value may be determined based on the nearest sample among restored samples located on the first angle based on the location of the unavailable reference sample.

FIG. 14 is a diagram illustrating a reference sample padding method based on the location of reference samples. As described above, the reference samples may be split into left reference samples and upper reference samples. According to an embodiment of the present invention, left reference samples and upper reference samples may be mapped to each other based on their respective positions. For example, an upper reference sample corresponding to each of the left reference samples may be determined.

According to an embodiment of the present invention, when any one of the first left reference sample and the first upper reference sample corresponding to each other is unavailable, the unavailable reference sample value may be determined based on another available value.

Specifically, in FIG. 14, an index indicating a relative position of each of the upper reference samples may be 0, ..., N−1, N, ..., 2N−1 from the left. In addition, an index indicating the relative position of each of the left reference samples is 0, ..., N−1, N, ... 2N−1 from the top. An upper reference sample having the same index and a left reference sample may be reference samples corresponding to each other. For example, when the index of the first left reference sample is 2N−1, the index of the first upper reference sample corresponding to the first left reference sample may be 2N−1.

Figure 15:
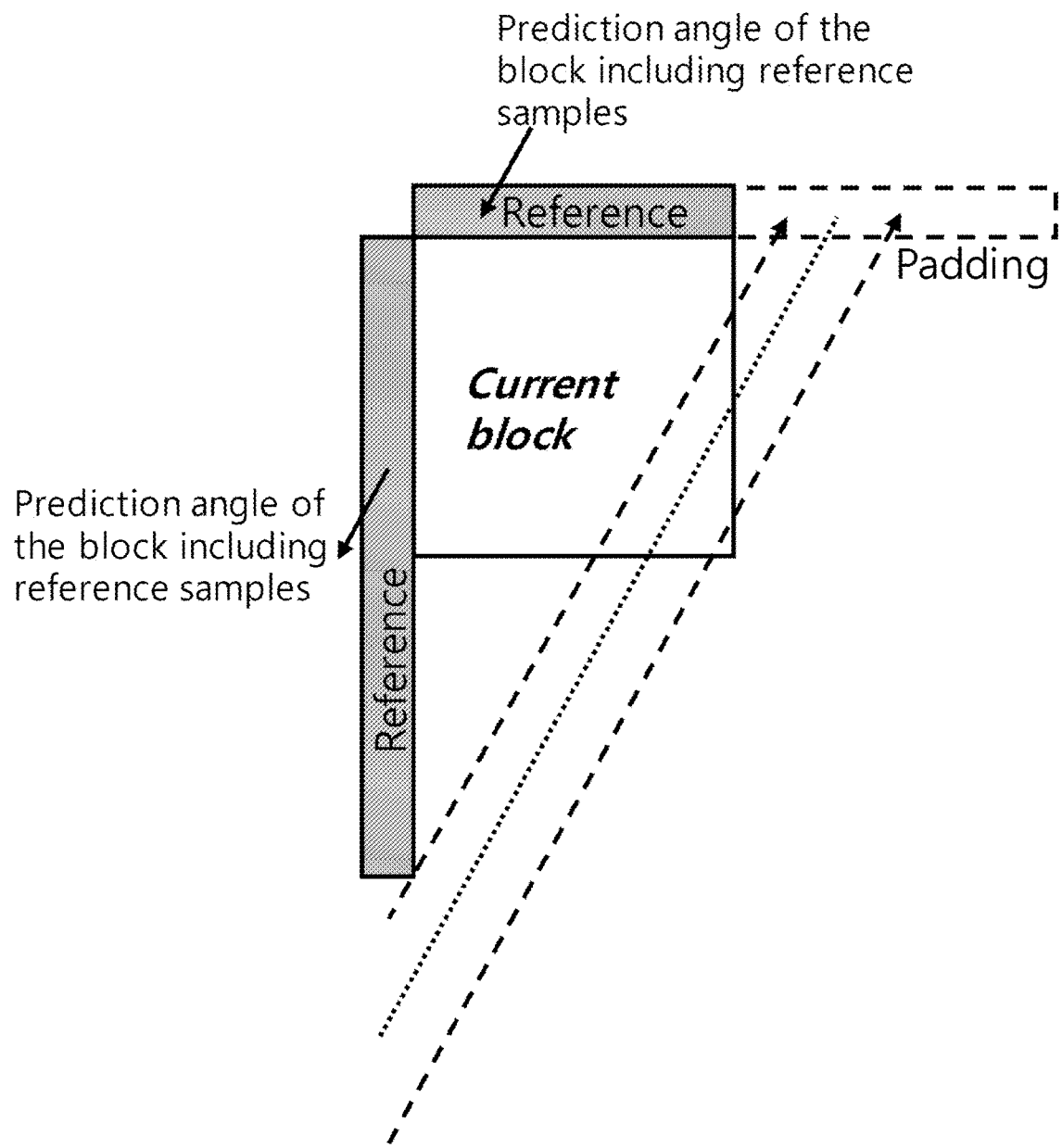
FIG. 15 is a diagram showing a method of performing reference sample padding based on neighboring samples.

FIG. 15 is a diagram showing a method of performing reference sample padding based on neighboring samples. Referring to FIG. 15, a sample located on a specific angle based on the location of the unavailable reference sample may be a sample outside the range of the reference sample determined based on the size of the current block. For example, if the size of the current block is W×H, the range of reference samples may be sample of the top left of the current block, 2W samples on the line adjacent to the top of the current block, and 2H samples on an adjacent line to the left of the current block. Also, the range of reference samples may be sample of the top left of the current block, W+H samples on the line adjacent to the top of the current block, and W+H samples on an adjacent line to the left of the current block. This is because, as described above, the coding tree unit may have a rectangular shape. In this case, the unavailable reference sample value may be determined using a restored sample that is outside the range of the reference sample. In this case, the restored samples may be samples located on an adjacent line to the upper or left side of the current block.

Hereinafter, a method in which reference sample padding of the current block is performed based on when the neighboring block is inter-predicted will be described with reference to FIGS. 16 to 18. According to an embodiment of the present invention, the decoder may generate a reference sample of the current block based on a sample of another picture.

Figure 16:
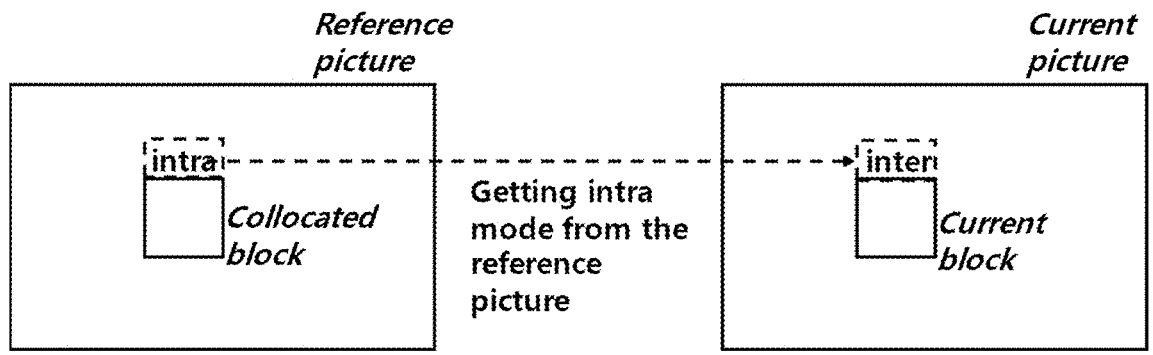
FIG. 16 is a diagram illustrating a reference sample padding method when a neighboring block is inter predicted.

FIG. 16 is a diagram illustrating a reference sample padding method when a neighboring block is inter predicted. According to an embodiment of the present invention, when the neighboring block of the current block is inter predicted, reference sample padding may be performed based on the sample(s) of the reference picture used for inter prediction of the neighboring block. The reference sample padding of the current block may be performed based on a neighboring sample of a collocated block corresponding to the same position as the current block in the reference picture. In the present disclosure, a collocated block may represent a block determined based on a reference picture index used for inter prediction of neighboring blocks. In this case, the location relationship between the collocated block neighboring sample and the collocated block may be the same as the relationship between the unavailable reference sample and the current block location.

Referring to FIG. 16, when at least some of the reference samples adjacent to the upper boundary of the current block are unavailable, reference sample padding may be performed based on neighboring samples adjacent to the upper boundary of the collocated block. According to a further embodiment, reference sample padding may be performed based on a method in which a neighboring block of a collocated block included in a reference picture is predicted (e.g., intra prediction mode or inter prediction). In this case, the above-described method in which the unavailable reference sample value is determined based on the intra prediction mode of the neighboring block may be applied in the same or corresponding way.

Figure 17:
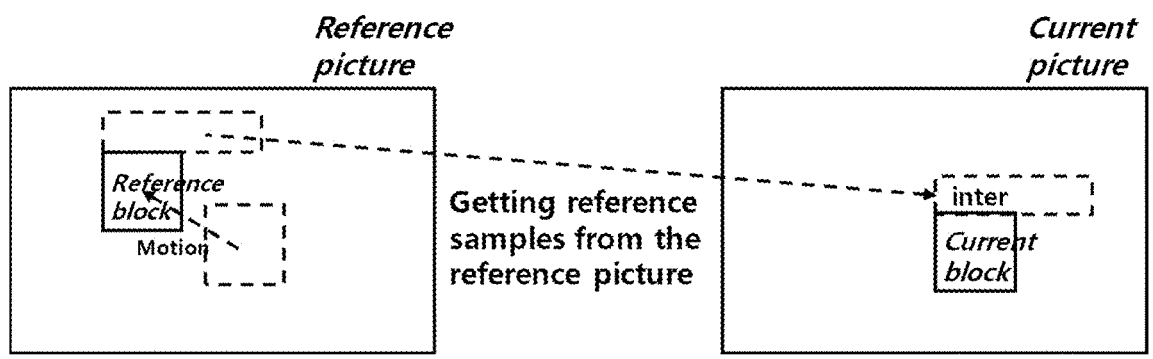
FIG. 17 is a diagram illustrating a reference sample padding method when a neighboring block is inter predicted.

FIG. 17 is a diagram illustrating a reference sample padding method when a neighboring block is inter predicted. According to an embodiment of the present invention, when the neighboring block of the current block is inter predicted, reference sample padding may be performed based on a reference picture index and motion vector used for inter prediction of the neighboring block. For example, the indirect reference block of the current block may be determined based on the reference picture and motion vector used for inter prediction of the neighboring block. Next, reference sample padding may be performed based on a neighboring sample of an indirect reference block existing in the reference picture.

Specifically, the unavailable first reference sample value may be determined based on a specific sample among neighboring samples of the indirect reference block. The positional relationship between the specific sample and the indirect reference block may be the same as the positional relationship between the current block and the first reference sample. Referring to FIG. 17, when at least some of the reference samples adjacent to the upper boundary of the current block are unavailable, reference sample padding may be performed based on neighboring samples adjacent to the upper boundary of the indirect reference block.

Figure 18:
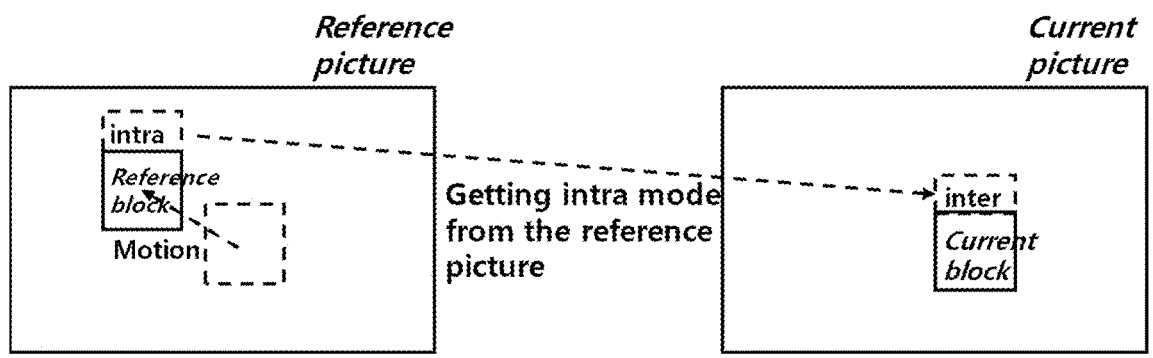
FIG. 18 is a diagram illustrating a reference sample padding method when a neighboring block is inter predicted.

FIG. 18 is a diagram illustrating a reference sample padding method when a neighboring block is inter predicted. According to an embodiment of the present invention, reference sample padding may be performed based on a method in which a neighboring block of an indirect reference block is predicted. For example, when the neighboring block of the indirect reference block is predicted based on any one of a plurality of intra prediction modes, reference sample padding may be performed based on the intra prediction mode of the neighboring block of the indirect reference block. Referring to FIG. 18, when the prediction mode of the neighboring block of the indirect reference block is the first intra prediction mode, values of unavailable reference samples of the current block may be determined based on the first intra prediction mode. In this case, the method described through FIGS. 11 to 15 may be applied by the same or corresponding method.

In the above-described embodiments, the reference sample padding describes reference samples included in a reference line adjacent to the current block, but the present disclosure is not limited thereto. As described above, the encoder and decoder according to an embodiment of the present invention may use samples on n reference lines within a predetermined distance from the boundary of the current block as reference samples for intra prediction of the current block. For example, the encoder may signal reference line information indicating at least one reference line used for prediction of a current block among n reference lines. The decoder can obtain reference line information from the bitstream.

Figure 19:
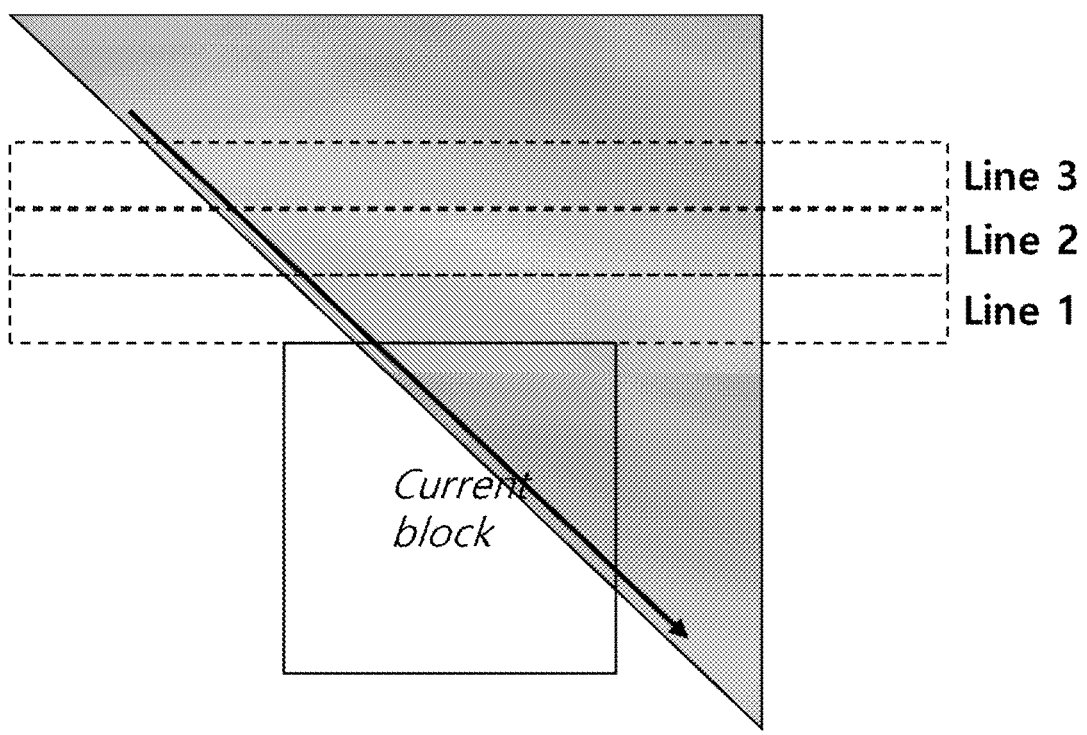
FIG. 19 is a diagram illustrating an embodiment of a plurality of reference lines configured with neighboring samples of a current block.

Hereinafter, when a plurality of reference lines are available for intra prediction of a current block according to an embodiment of the present invention, the neighboring samples configuring each reference line will be described with reference to FIG. 19. FIG. 19 is a diagram illustrating an embodiment of a plurality of reference lines configured with neighboring samples of a current block. Here, the neighboring sample of the current block may be a sample located within a predetermined distance from the boundary line of the current block.

As described above with reference to FIG. 5, samples of one or more of the plurality of reference lines may be used for intra prediction of the current block. For example, the plurality of reference lines may include a line located at a distance of n samples from the boundary of a specific block to be predicted. In this case, n may be an integer of 0 or more.

Referring to FIG. 19, a first reference line Line 1, a second reference line Line 2, and a third reference line Line 3 may be configured based on the boundary of the current block. Specifically, the first reference line may be configured with adjacent samples positioned on a line adjacent to the boundary of the current block. The second reference line may be configured with samples positioned on a line spaced by one sample based on the boundary of the current block. The third reference line may be configured with samples positioned on a line spaced by two samples based on the boundary of the current block. Although the reference line of the upper boundary neighboring of the current block is described as an example in FIG. 19, the present disclosure is not limited thereto. For example, there may be a plurality of reference lines configured based on the left boundary of the current block.

In intra prediction mode, reference samples used for prediction of the current block may be neighboring samples of the current block. For example, neighboring samples may include samples on a line adjacent to the boundary of the current block. The neighboring samples may be samples adjacent to the upper boundary of the current block and samples adjacent to the left boundary. Also, the neighboring sample may include a sample located on the above left side of the current block.

Also, neighboring samples may include samples that are not adjacent to the boundary of the current block. Specifically, neighboring samples may include samples on a line spaced by a specific number of samples from the leftmost sample in the current block to the left. In addition, neighboring samples may include samples on a line spaced apart by a specific number of samples from the uppermost sample in the current block. Here, the specific sample number may be less than or equal to a preset number of samples. For example, when the preset number of samples is 2, the specific number of samples may be any one of 0 to 2. Further, the number of samples may mean the number of integer pixels.

Meanwhile, the intra prediction mode of the current block may be determined based on other information related to intra prediction of the current block. According to an embodiment of the present invention, the intra prediction mode of the current block may be determined based on reference samples used for intra prediction of the current block. This is because the intra prediction method is a prediction method based on regional similarity between a current block and a neighboring block.

For example, the encoder and decoder can determine the intra prediction mode of the current block based on reference samples of the current block. According to an embodiment of the present invention, the encoder implicitly may signal intra prediction mode information using reference samples, or signal the intra prediction mode information with a smaller number of bits by generating a set of intra prediction modes configured in some of the entire modes. Through this, signaling for intra prediction mode information may be efficiently performed.

According to an embodiment of the present invention, depending on the characteristics of reference samples of the current block, the intra prediction mode set of the current block may be configured. The encoder and decoder may configure the intra prediction mode set according to predefined rules according to the characteristics of the reference samples of the current block. In this case, the intra prediction mode set configured by the encoder and the decoder may be identical to each other. Also, the decoder may determine the intra prediction mode of the current block based on the configured intra prediction mode set and signaled intra prediction mode information. The intra prediction mode information may be a sub index indicating any one of a plurality of modes configuring an intra prediction mode set. In this case, the sub index may be a value distinguished from the intra prediction mode index described above. For example, the sub index may be a value mapped to any one of modes included in the intra prediction mode set according to a preset mapping rule.

The intra prediction mode set may be configured with some of all modes. For example, the intra prediction mode set may be configured in a predefined method according to information related to reference sample padding. The intra prediction mode set may be configured in a predefined method according to the location of the reference samples. Specifically, the location of the reference samples may be a reference line.

Figure 20:
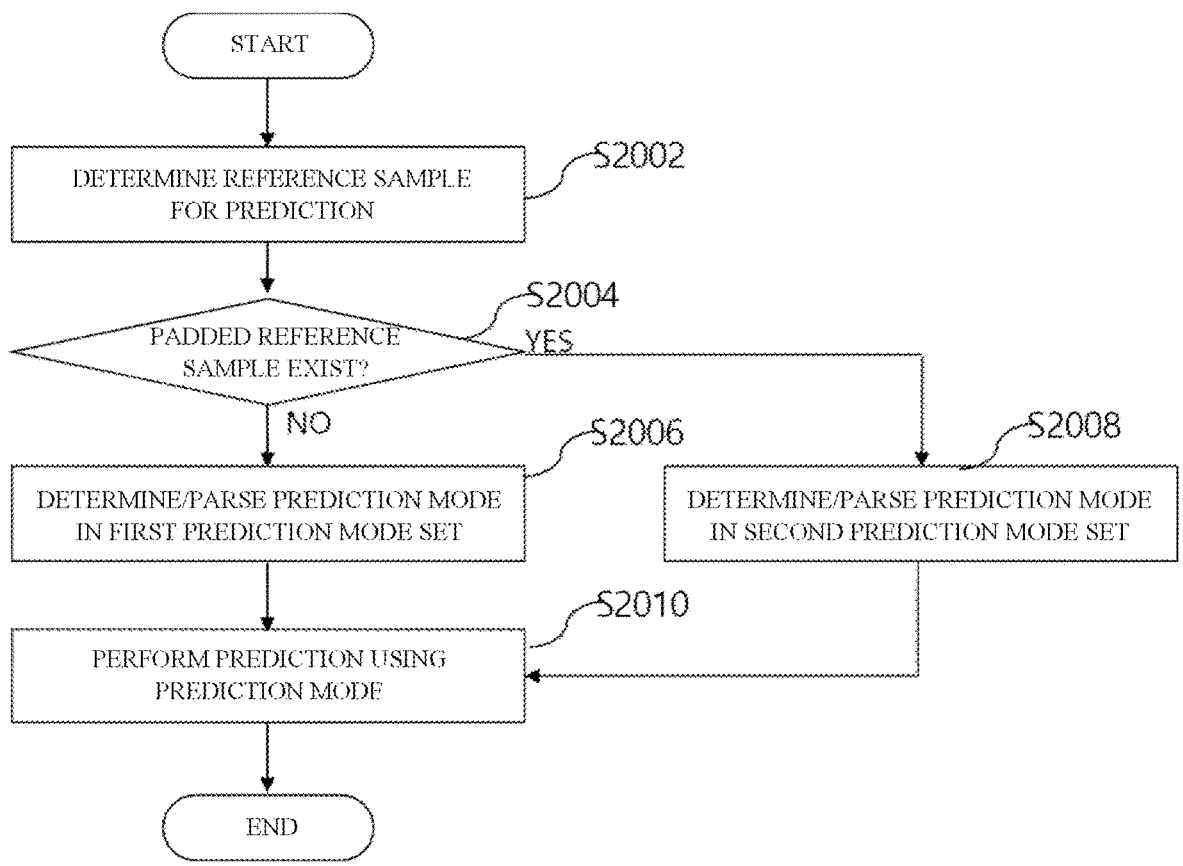
FIG. 20 is a diagram illustrating a method in which an intra prediction mode of a current block is signaled.

Hereinafter, a method in which the intra prediction mode of the current block is determined based on information related to the reference sample of the current block according to an embodiment of the present invention will be described with reference to FIG. 20. FIG. 20 is a diagram illustrating a method in which an intra prediction mode of a current block is signaled.

Referring to FIG. 20, in operation S2002, a plurality of reference samples for intra prediction of the current block may be determined. The decoder may prepare reference samples of the current block based on neighboring samples of the current block. For example, if at least some of the reference samples are unavailable, the decoder may perform reference sample padding. Also, the decoder can determine the reference line. For example, the encoder may signal reference line information indicating a reference line used for prediction of the current block. The decoder can receive reference line information from the bitstream. The decoder may determine at least one reference line used for prediction of the current block based on the reference line information.

Next, an intra prediction mode set may be determined based on reference samples. According to an embodiment of the present invention, the intra prediction mode of the current block may be determined based on the presence of a padded reference sample among reference samples. Referring to operation S2004, an intra prediction mode may be determined based on the presence of a padded reference sample. For example, different intra prediction mode sets may be used according to whether reference samples are padded. Here, configure of the intra prediction mode included in each of the different intra prediction mode sets may be different. For example, the first intra prediction mode set may be configured with at least a part of the intra prediction mode configuring the second intra prediction mode set. The first intra prediction mode set includes intra prediction modes configuring the second intra prediction mode set, and may further include other intra prediction modes.

When the reference sample padding is not performed (operation S2004), the intra prediction mode of the current block may be determined based on the first intra prediction mode set (operation S2006). In this case, the first intra prediction mode set may be a set configured with the entire intra prediction mode. The decoder may determine the intra prediction mode of the current block based on the first intra prediction mode set. The encoder may signal intra prediction mode information indicating any one of modes configuring the first intra prediction mode set. The decoder may determine one intra prediction mode of the first intra prediction mode set based on the intra prediction mode information received from the bitstream. In addition, the decoder may perform intra prediction on the current block based on the determined intra prediction mode.

When at least one padded reference sample exists (operation S2004), the intra prediction mode of the current block may be determined based on the second intra prediction mode set (operation S2008). In this case, the second intra prediction mode set may be a set configured with some of the entire intra prediction modes. If a padded sample is present, an intra prediction mode set in which the angular mode for predicting the current block with reference to the padded reference sample is excluded can be used. This is because the probability of predicting the current block based on the padded reference sample may be lower than the probability of predicting the current block based on the restored reference sample. The decoder may determine the intra prediction mode of the current block based on the second intra prediction mode set. The encoder may signal intra prediction mode information indicating any one of modes configuring the second intra prediction mode set. The decoder may determine one intra prediction mode of the second intra prediction mode set based on the intra prediction mode information received from the bitstream. In addition, the decoder may perform intra prediction on the current block based on the determined intra prediction mode.

According to a further embodiment of the present invention, the intra prediction mode of the current block may be determined based on the location of the padded reference sample. For example, different intra prediction mode sets may be used according to the location of the padded reference sample. In the above-described embodiment, although one of the first intra prediction mode and the second intra prediction mode is selected as an example, the present disclosure is not limited thereto. For example, a plurality of intra prediction mode sets may be configured according to characteristics of reference samples. Also, the intra prediction mode of the current block may be determined based on any one of a plurality of intra prediction mode sets.

According to an embodiment of the present invention, an intra prediction mode set for prediction of a current block may be configured according to the location of a reference sample. The location of the reference samples may be a reference line. As described above, the encoder and decoder can predict the current block using any one of a plurality of reference lines configured with neighboring samples of the current block. According to an embodiment, the intra prediction mode of the current block may be determined based on a reference line including reference samples of the current block.

For example, the intra prediction mode set for the current block may be configured based on reference line informa-tion. The reference line information may be information indicating a reference line used for prediction of the current block among a plurality of reference lines of the current block. The plurality of reference lines of the current block may include a first reference line configured with neighboring samples on a line adjacent to the boundary of the current block. The plurality of reference lines of the current block may include one or more second reference lines that are not adjacent to the boundary of the block. In addition, each of the one or more second reference lines may be configured with neighboring samples on a line spaced apart by a specific number of samples based on the boundary of the corresponding block. In this case, a specific number of samples separated from the boundary of the current block may be different for each reference line.

According to an embodiment, when the reference line for intra prediction of the current block is the first reference line, the intra prediction mode of the current block may be determined based on the first intra prediction mode set. The first intra prediction mode set may include the entire intra prediction mode. In addition, when the reference line for intra prediction of the current block is not the first reference line, the intra prediction mode of the current block may be determined based on the second intra prediction mode set. According to an embodiment, a plurality of reference lines may be used for intra prediction of the current block. When a plurality of reference lines for intra prediction of the current block includes a second reference line, the intra prediction mode of the current block may be determined based on the second intra prediction mode set. The second intra prediction mode set may be configured with part of modes configuring the first intra prediction mode.

Specifically, the second intra prediction mode set may be configured with n angular modes. In addition, the first intra prediction mode set may include m angular modes, planar mode, and DC mode. In this case, m may be greater than n. According to an embodiment, m may be the total number of angular modes used for intra prediction. In addition, the second intra prediction mode set may be configured in some of the modes for configuring the first intra prediction mode set. The angular modes may include the basic angular mode and the extended angular mode described above with reference to FIG. 6. According to an embodiment, the second intra prediction mode set may be configured based on the intra prediction mode of the neighboring block of the current block.

The second intra prediction mode set may include an intra prediction mode of an intra predicted block among neighboring blocks. According to an embodiment, when the intra prediction mode of the neighboring block is an angular mode, the angular mode may be included in the second intra prediction mode set. Also, the second intra prediction mode set may be configured with a preset number of angular modes. For example, the second intra prediction mode set may include angular modes in which the preset offset (e.g., −1, +1) is added to the angular mode of the neighboring block. In the case of a plurality of blocks predicted based on the intra prediction mode among neighboring blocks of the current block, the second intra prediction mode set may be configured in consideration of the context of neighboring blocks. For example, the second intra prediction mode set may be configured in the same or corresponding manner to the MPM list configuration method described above with reference to FIG. 7. The second intra prediction mode set may be an MPM list.

If there is no intra-predicted block based on the angular mode among neighboring blocks of the current block, the second intra-prediction mode set may be configured based on a preset angular mode. For example, the preset angular mode may include at least one of a horizontal diagonal mode, a horizontal mode, a diagonal mode, a vertical mode, and a vertical diagonal mode. Also, the second intra prediction mode set may include angular modes in which a preset offset (e.g., −1, +1) is added to a preset angular mode.

According to an embodiment, the encoder may signal reference line information indicating a reference line used for prediction of the current block among a plurality of reference lines of the current block. The decoder can obtain reference line information from the bitstream. Also, the encoder and decoder may configure an intra prediction mode set according to predefined rules based on reference line information. In this case, the intra prediction mode set configured by the encoder and the decoder may be identical to each other. The decoder may determine an intra prediction mode for the current block based on the configured intra prediction mode set.

For example, the encoder may signal intra prediction mode information indicating any one of the configured intra prediction mode sets. The decoder may obtain intra prediction mode information by parsing the bitstream. The decoder may determine the intra prediction mode index of the current block based on the intra prediction mode set and intra prediction mode information. The decoder may perform intra prediction of the current block based on the determined intra prediction mode index. In addition, the decoder may perform intra prediction of a current block based on a plurality of reference samples on the reference line according to the reference line information and an intra prediction mode index. The decoder may determine a reference line used for prediction of the current block based on the reference line information. When at least some of the plurality of samples on the reference line used for intra prediction of the current block are unavailable, the decoder may prepare reference samples of the current block by performing the reference sample padding described above with reference to FIGS. 9 to 18.

Through this, a method of configuring an intra prediction mode set configured with some modes among all modes may be implicitly signaled through reference line information. According to the reference line, an intra prediction mode set including intra prediction modes having a high probability of being used for prediction of the current block may be configured. This is because intra prediction modes in which prediction performance is improved according to reference lines may be different. In addition, intra prediction mode information indicating one of the intra prediction mode sets configured with fewer modes than the total number of modes may be signaled. Accordingly, efficient signaling for intra prediction mode information may be performed.

In operation S2010, prediction for the current block may be performed based on the determined intra prediction mode. The decoder may generate a prediction block by performing intra prediction on the current block based on the determined intra prediction mode.

Figure 21:
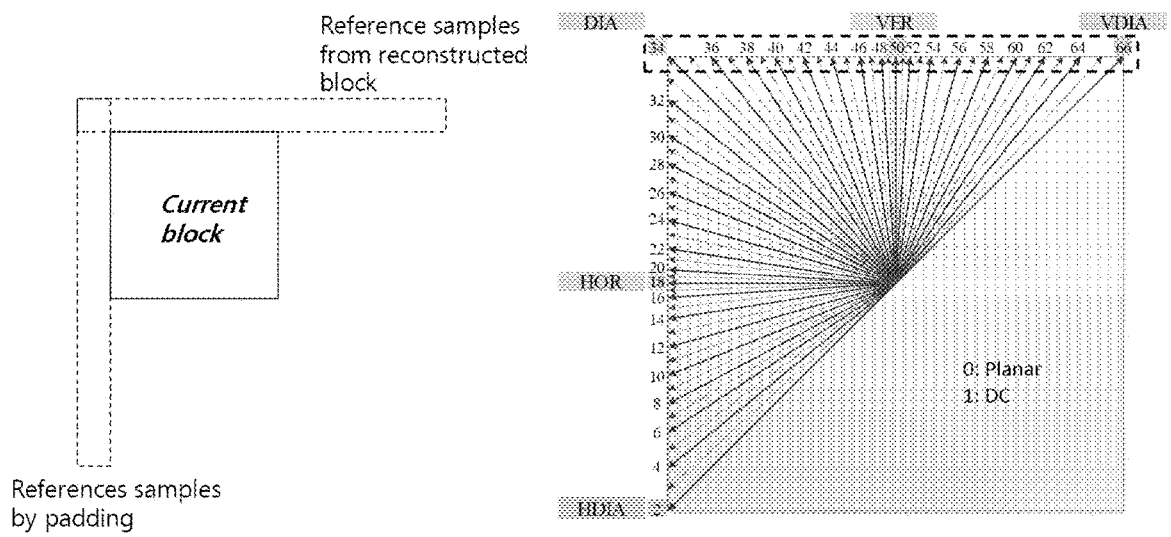
FIG. 21 is a diagram showing a method in which intra prediction mode information is signaled based on the location of a padded reference sample.

FIG. 21 is a diagram showing a method in which intra prediction mode information is signaled based on the location of a padded reference sample. According to an additional embodiment of the present invention, an intra prediction mode corresponding to an additional angle may be signaled according to the position of the padded reference sample. For example, in FIG. 21, the intra prediction mode set for the current block may be configured with modes between index 34 and index 66. In this case, an additional angle between angles corresponding to indexes 34 to 66 may be signaled using bit(s) allocated to signal the intra prediction mode corresponding to the index smaller than index 34. Alternatively, intra prediction mode information may be signaled with a smaller number of bits through an intra prediction mode set configured with some of all modes.

Referring to FIG. 21, neighboring samples adjacent to an upper boundary of a current block may include a restored sample. In addition, neighboring samples adjacent to the left boundary of the current block may be configured with all padding neighboring samples. In this case, the intra prediction mode of the current block may be determined such that upper neighboring samples are used for intra prediction. For example, the intra prediction mode set may be configured with intra prediction modes corresponding to indexes 34 to 66. This is because the probability of prediction using previously restored reference samples may be higher than the probability of prediction using padded reference samples.

Figure 22:
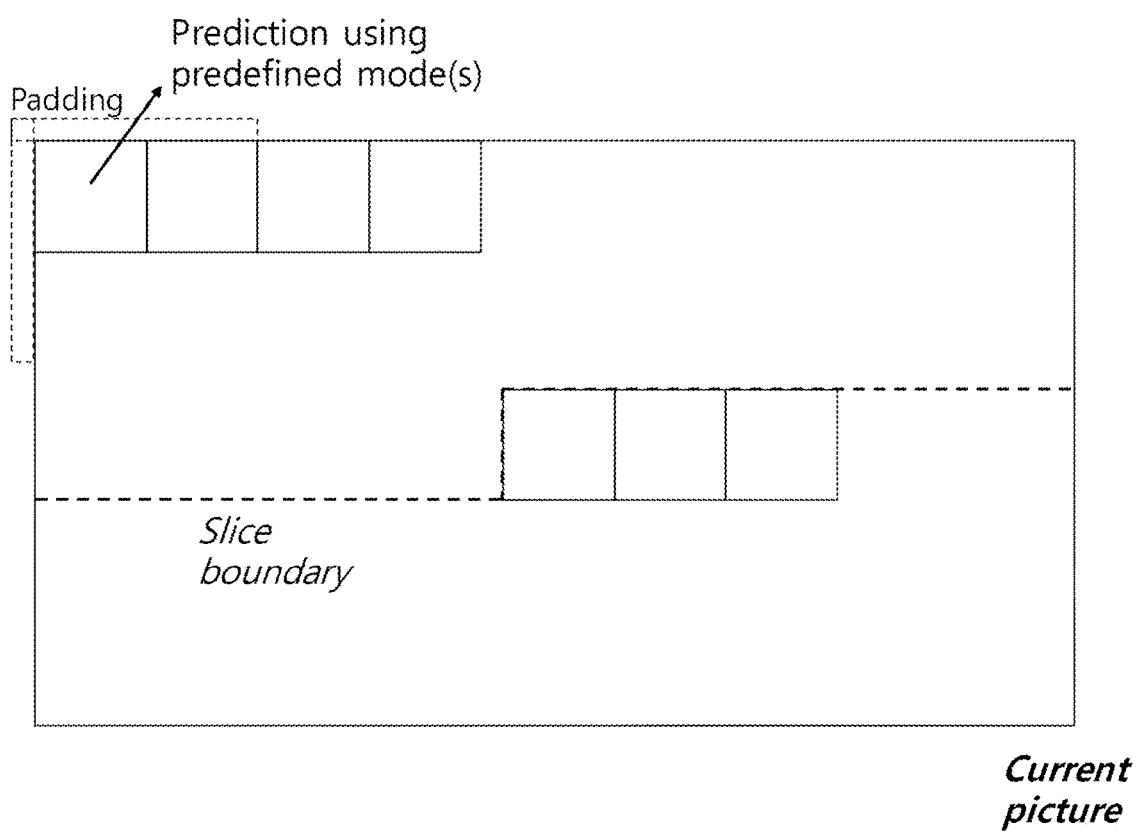
FIG. 22 is a diagram showing a method in which an intra prediction mode is determined based on a relative position of a current block.

FIG. 22 is a diagram showing a method in which an intra prediction mode is determined based on a relative position of a current block. According to an embodiment of the present invention, the intra prediction mode of the current block may be determined based on the relative position of the current block in the upper level region of the current block. Here, the upper level region of the current block may be a slice or tile including the current block. Also, the upper level region of the current block may be a picture including the current block. Also, the upper level region of the current block may be a CTU or a coding tree block (CTB) including the current block.

According to an embodiment, the intra prediction mode set for the current block may be configured differently according to the relative position of the current block in the upper level region. This is because the neighboring sample of the current block may not be available for prediction of the current block depending on the location of the current block. For example, different intra prediction mode sets may be configured according to a relative position of a current block in a picture, slice, tile, CTU, or CTB. The decoder may determine the intra prediction mode of the current block using the configured intra prediction mode set according to the relative position of the current block.

The encoder and decoder can configure the intra prediction mode set according to a predefined rule based on the relative position of the current block in the upper level region. In this case, the intra prediction mode set configured by the encoder and the decoder may be identical to each other. In addition, the decoder may determine the intra prediction mode of the current block using the configured intra prediction mode set. In addition, the decoder may perform prediction of the current block based on the determined intra prediction mode.

According to an embodiment of the present invention, when the location of the current block is a preset location, the intra prediction mode of the current block may be determined using a preset intra prediction mode set. In this case, the position of the current block may indicate a position in an upper level region of an upper left corner sample of the current block among samples included in the current block. Specifically, the preset position may be a position where the boundary of the current block is adjacent to the boundary of the upper level area. The preset position may be a position set based on at least one of a scan order or an encoding/decoding order. For example, the preset position may be a position of a block that is processed first in a region capable of parallel processing. The preset position may be a position adjacent to an upper boundary of a picture (or tile/slice/CTU/CTB). In addition, the preset position may be a position adjacent to the left boundary of a picture (or tile/slice/CTU/CTB). This is because if a current block is adjacent to a boundary of a picture (or tile/slice/CTU/CTB), a previously restored block may not exist in the current block neighboring. The preset intra prediction mode set may be configured with an entire intra prediction mode.

In addition, if the upper boundary of the current block overlaps with the upper boundary of the upper level region, available upper neighboring blocks may be limited. In this case, use of a reference line that is not adjacent to the boundary of the current block among the plurality of reference lines described above may not be permitted. When the current block is adjacent to the upper boundary of the upper level region, the encoder and the decoder can define in advance that adjacent reference lines are used in the current block. Accordingly, when the current block is adjacent to the upper boundary of the upper level region, the decoder can predict the current block based on the reference line adjacent to the current block. Also, the decoder may configure an intra prediction mode set of the current block based on a reference line adjacent to the current block, and determine an intra prediction mode. Also, the decoder may perform prediction on the current block based on the determined intra prediction mode.

According to an embodiment of the present invention, if the current block location is not the above-mentioned predetermined location, the intra prediction mode set may be configured in the manner described above with reference to FIGS. 19 to 21. If the position of the current block is not the above-described preset position, the encoder and decoder may configure an intra prediction mode set configured with some of the entire modes. In addition, the decoder can perform intra prediction on the current block based on the configured intra prediction mode.

According to another embodiment of the present invention, when the position of the current block is a preset position, prediction for the current block may be performed using a preset intra prediction mode. In this case, the preset intra prediction mode may include at least one of a planar mode or a DC mode. In addition, when the location of the current block is a preset location, the encoder and the decoder can perform intra prediction for the current block using an intra prediction mode set configured with intra prediction modes except for some angular modes. In this case, some angular mode may be determined according to the location of the unavailable reference sample among the reference samples of the current block. For example, it may be angular modes corresponding to a prediction direction predicted from an unavailable reference sample. Specifically, when the reference sample located on the left side of the current block is unavailable, the encoder and decoder may configure an intra prediction mode set configured with the remaining intra prediction modes except at least intra prediction mode indexes 2 to 18. This is because when the reference sample padding is performed according to the position of the current block, the probability that some angular mode is used for intra prediction of the current block may be lowered.

According to another embodiment of the present invention, the intra prediction mode of the current block may be determined based on similarity between reference samples of the current block. In this case, the intra prediction mode of the current block may be signaled implicitly. The encoder and the decoder may select the intra prediction mode of the current block using predetermined rules without additional signaling. This intra prediction mode information signaling scheme may be referred to as implicit signaling. Hereinafter, a method of determining the intra prediction mode of the current block based on the similarity between neighboring samples of the current block will be described in detail with reference to FIGS. 23 to 25.

Figure 23:
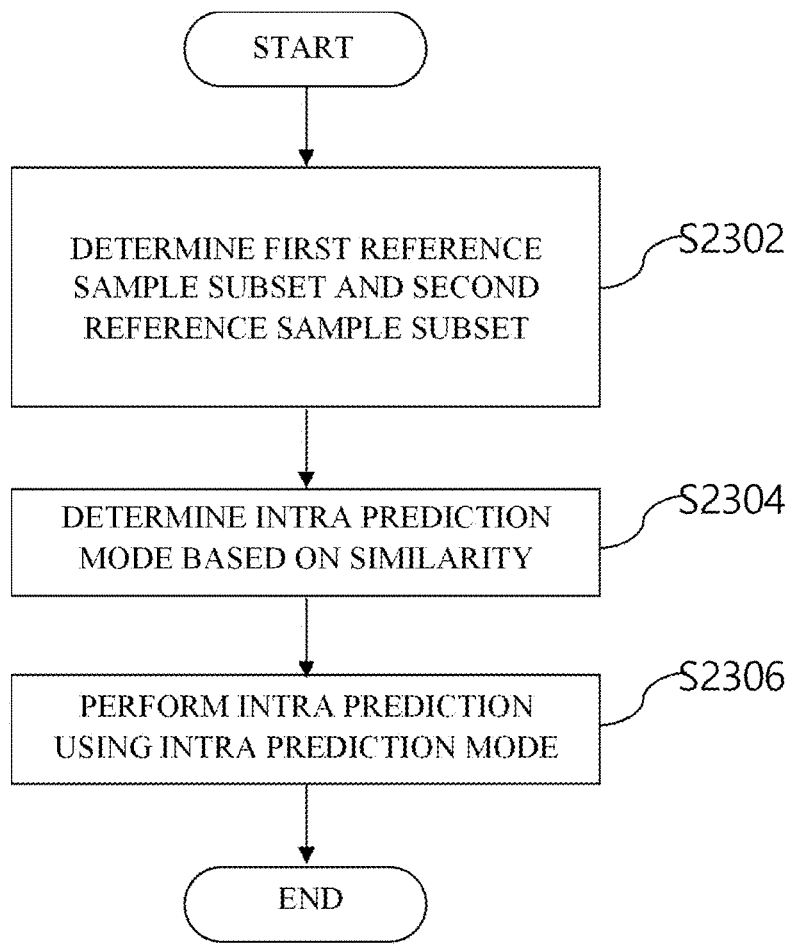
FIG. 23 is a diagram showing an embodiment of a method of determining an intra prediction mode of a current block based on a reference sample.

FIG. 23 is a diagram illustrating an embodiment of a method of determining an intra prediction mode of a current block based on similarity between neighboring samples. According to an embodiment of the present disclosure, the intra prediction mode of the current block may be determined using a plurality of reference sample subsets configured with a plurality of neighboring samples. For example, the intra prediction mode of the current block may be determined based on the similarity between the first reference sample subset and the second reference sample subset. Here, the neighboring sample configuration included in each of the first reference sample subset and the second reference sample subset may be different.

Hereinafter, a method for determining an intra prediction mode based on a first reference sample subset and a second reference sample subset will be described for convenience of description, but the present disclosure is not limited thereto. For example, two or more subsets of reference samples may be configured, and based on this, an intra prediction mode of the current block may be determined.

Referring to FIG. 23, in operation S2302, the decoder may determine a first reference sample subset and a second reference sample subset similar to the first reference sample subset. The first reference sample subset and the second reference sample subset may be configured with neighboring samples at different locations. For example, the first reference sample subset may be a subset configured with neighboring samples located above the current block. Also, the second reference sample subset may be a subset configured with neighboring samples located on the left side of the current block. The first reference sample subset and the second reference sample subset may be subsets configured with samples on different reference lines.

The second reference sample subset may be determined based on similarity with the first reference sample subset. For example, the second reference sample subset may be a subset having a greater degree of similarity with a first reference sample subset. For example, the similarity may be a correlation between the first reference sample subset and the second reference sample subset. Similarity may be calculated based on values of neighboring samples included in the reference sample subset.

Specifically, the similarity may be calculated through a method of comparing a value of a first neighboring sample that is one of a plurality of neighboring samples configuring a subset of the first reference sample and a value of a second neighboring sample that is one of a plurality of neighboring samples configuring a second subset of reference samples. Also, the similarity may be calculated by comparing values of a plurality of samples for each location. The encoder and decoder may compare values of a plurality of reference samples configuring a first subset of reference samples and values of a plurality of reference samples configuring a second subset of reference samples.

According to an embodiment, the similarity may be calculated based on at least one of a gradient, a change in direction, or a difference in sample values between a plurality of neighboring samples configuring each of the first reference sample subset and the second reference sample subset. For example, the encoder and the decoder may calculate the similarity by comparing the gradient values of samples configuring the first subset of reference samples and the gradient values of samples configuring the second subset of reference samples. The encoder and decoder may calculate the similarity by comparing a sample value difference between samples configuring the first reference sample subset and a sample value difference between samples configuring the second reference sample subset.

In addition, based on at least one of a gradient, a change in direction, or a difference in sample values of a plurality of neighboring samples configuring a subset of reference samples, a plurality of subsets including edges may be obtained. When the first reference sample subset and the second reference sample subset include edges, the intra prediction mode of the current block may be determined based on the positional relationship of the first reference sample subset and the second reference sample subset.

According to an additional embodiment of the present invention, the first reference sample subset and the second reference sample subset may be configured except for the unavailable reference sample. The reference sample subset may not include a reference sample at a location where padding is performed. This is because the sample value of the padded reference sample is a value generated based on the values of adjacent samples. Also, an error may occur when similarity is calculated using reference samples that are not restored.

According to a further embodiment of the present invention, the second reference sample subset may be determined using additional subpixels. For example, similarity between a plurality of reference sample subsets may be calculated using subpixels of each of the plurality of reference sample subsets. In this case, the sub-pixel may be a subpel unit pixel located between adjacent integer samples. The subpixel may be a value obtained by interpolating an integer sample. The subpixel may be obtained using at least one of a linear filter or DCT filter used for intra prediction. When using subpixels, a greater number of angular modes may be signaled implicitly.

In operation S2304, the intra prediction mode of the current block may be determined. For example, the intra prediction mode of the current block may be determined based on the positional relationship between the first reference sample subset and the second reference sample subset. In this regard, it will be described with reference to FIGS. 24 and 25. In operation S2305, intra prediction for the current block may be performed based on the determined intra prediction mode. Meanwhile, in the present embodiment, the sample used to calculate the similarity and the reference sample referenced in the intra prediction process may be different samples. For example, in the embodiments of FIGS. 23 to 25, the reference sample subset may be configured with neighboring samples of the current block regardless of being referenced in intra prediction.

According to a further embodiment of the present invention, an intra prediction mode of a current block may be determined based on a plurality of subsets of reference samples configured with neighboring samples. For example, a plurality of candidate subsets may be configured based on the location of neighboring samples. Also, a pair of subsets having the highest similarity may be determined by calculating the similarity between the plurality of candidate subsets.

Further, according to an additional embodiment of the present invention, the change amount between neighboring samples of the current block may be determined first. The change amount may be calculated based on a gradient, slope, or sample value difference between neighboring samples of the current block. Depending on the change amount between neighboring samples of the current block, it may be determined whether the intra prediction mode is signaled in the above-mentioned method. For example, if it is less than a preset change amount, the intra prediction mode of the current block may not be signaled in the above-mentioned method. In addition, if it is greater than or equal to a preset amount, the intra prediction mode may be signaled by the above-mentioned method. Alternatively, even if it is less than a preset change amount, the intra prediction mode may be signaled by the above-mentioned method. This is because in the case of planar mode or DC mode, the change amount between neighboring samples may not be large.

Figure 24:
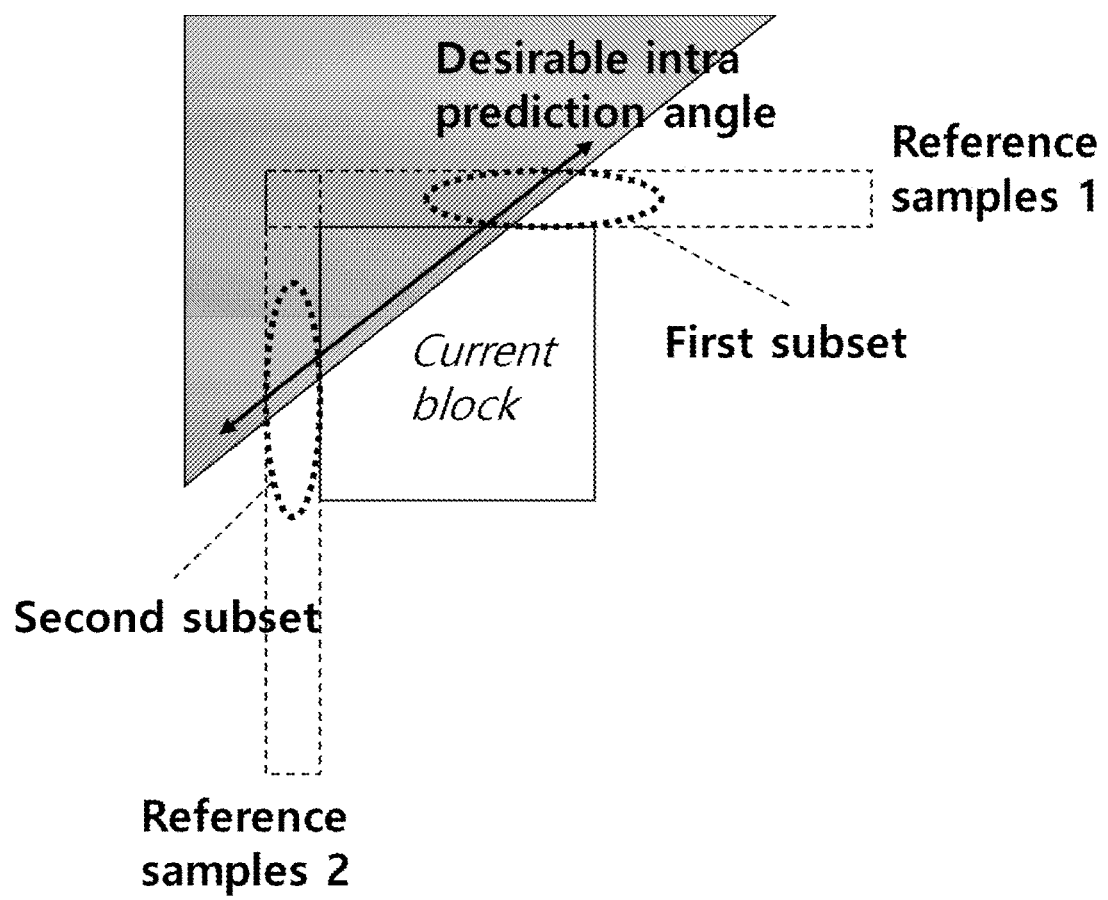
FIG. 24 is a diagram showing an embodiment of a method of determining an intra prediction mode of a current block based on a reference sample.

FIG. 24 is a diagram showing an embodiment of a method of determining an intra prediction mode of a current block based on a neighboring sample. Referring to FIG. 24, the shaded portion may indicate a region in which the first reference sample subset and the second reference sample subset are similar. For example, sample values of each sample included in the shaded portion of the original picture or the restored picture may be a value within a preset range. As the prediction direction is closer to the shape of the shaded portion, prediction performance may be improved.

In FIG. 24, the first reference sample subset may be configured with a plurality of neighboring samples located above the current block. In addition, the second reference sample subset may be configured with a plurality of neighboring samples located on the left side of the current block. Among neighboring samples configuring the first subset of reference samples, values of neighboring samples included in the shaded portion may be changed to be similar to values of neighboring samples included in shaded portions among the neighboring samples configuring the second reference sample subset. In this case, the intra prediction mode of the current block may be determined based on a direction in which samples with high similarity are connected.

According to a further embodiment of the present invention, a plurality of intra prediction modes may be determined based on the first reference sample subset and the second reference sample subset determined in operation S2302. For example, two angular modes corresponding to an angle determined based on the positions of the first reference sample subset and the second reference sample subset may be possible. Each of the two angular modes may be a first angular mode and a second angular mode opposite to directions corresponding to the first angular mode. Intra prediction mode information indicating one of a plurality of angular modes needs to be signaled. In addition, when one of the first angular mode and the second angular mode determined based on the positions of the first reference sample subset and the second reference sample subset corresponds to the wide-angle mode described above, the current block may be predicted based on the angular mode rather than the wide-angle mode.

According to an embodiment, an intra prediction mode of a current block may be determined based on an index of a plurality of angular modes. For example, an angular mode having the smallest index among a plurality of angular modes may be used as the intra prediction mode of the current block. Alternatively, an angular mode having the largest index among a plurality of angular modes may be used as the intra prediction mode of the current block.

According to another embodiment, the intra prediction mode of the current block may be determined based on the residual signal of the current block. For example, the intra prediction mode of the current block may be determined using a residual signal for each region in the current block. Specifically, the sum of the first residual signals of samples located on the uppermost line in the current block may be obtained. A second residual signal sum of samples located in the leftmost line in the current block may be obtained. When the sum of the second residual signals is greater than the sum of the first residual signals, an intra prediction mode corresponding to a prediction angle predicted from the top to the left may be used for prediction of the current block. Conversely, when the first residual signal sum is greater than the second residual signal sum, an intra prediction mode corresponding to a prediction angle predicted from left to top may be used for prediction of the current block. This is because, in the case of intra prediction, a residual signal may be less as a predicted sample is closer to a reference sample used for intra prediction.

According to another embodiment, the intra prediction mode of the current block may be determined based on the number of padded reference samples included in the reference sample subset. For example, an intra prediction mode in a direction referenced from a subset of reference samples with a smaller number of padded reference samples may be used for prediction of the current block. This is because the padded reference sample may represent less characteristics of the original signal than the restored reference sample. Also, it may be because the probability of prediction based on the restored reference sample may be higher than the probability of prediction based on the padded reference sample.

Figure 25:
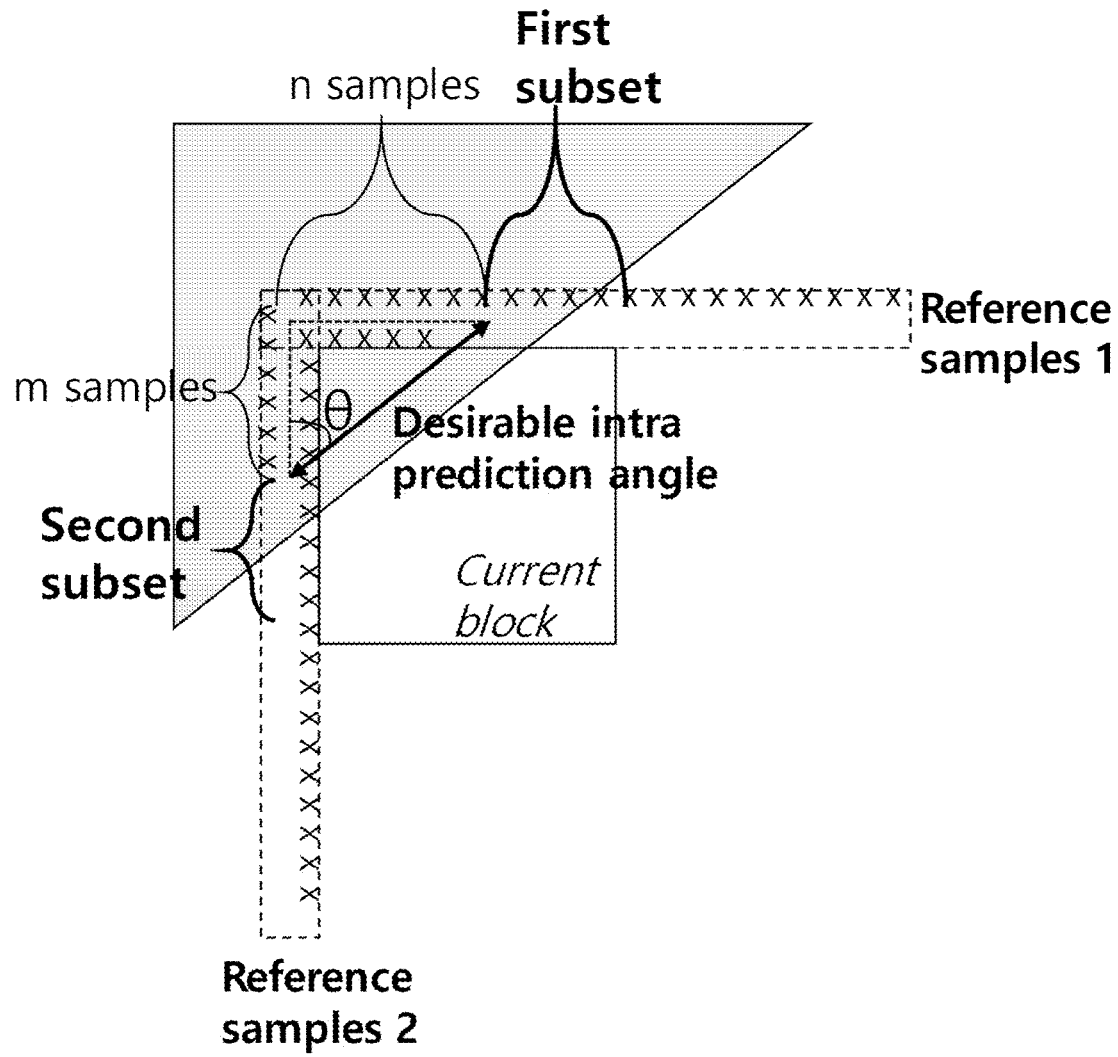
FIG. 25 is a diagram showing an embodiment of a method of determining an intra prediction mode of a current block based on a reference sample.

FIG. 25 is a diagram showing an embodiment of a method of determining an intra prediction mode of a current block based on a neighboring sample. Referring to FIG. 25, the intra prediction mode of the current block may be determined based on the positions of the first reference sample subset and the second reference sample subset. As described above, the first reference sample subset and the second reference sample subset may be a pair of subsets having similarity or higher than a predetermined value.

In FIG. 25, the first subset of reference samples may include a first sample located n-th to the right from a neighboring sample located on the upper left side of the current block. Also, the first reference sample subset may include a preset number of samples that are continuous from the first sample to the right. The second reference sample subset may include a second sample located m-th downward from a neighboring sample located on the upper left side of the current block. In addition, the second reference sample subset may include a preset number of samples that are consecutively downward from the second sample.

In this case, the intra prediction mode of the current block may be determined based on n and m. Specifically, in FIG. 25, an angle θ between a line connecting the first sample and the second sample and a line adjacent to the left boundary of the current block may be arctan(n/m). The intra prediction mode of the current block may be a prediction mode corresponding to the first angle θ or the second angle (θ−a*π). In this case, a is an integer, and π may be a circumference.

Meanwhile, among a plurality of angular modes included in the intra prediction mode set, an angular mode coinciding with a line connecting the first sample and the second sample may not exist. For example, the first angle θ may not be mapped to an angle corresponding to preset angular modes as shown in FIG. 6. In this case, an angular mode corresponding to an angle closest to the first angle θ among angles corresponding to the angular modes may be used as an intra prediction mode of the current block.

As described above, the intra prediction mode of the current block may be determined based on the similarity between neighboring samples of the current block. Accordingly, the encoder and decoder can reduce signaling overhead for the intra prediction mode of the current block. According to a further embodiment of the present invention, when a method of determining an intra prediction mode of a current block based on a reference sample and an existing method of signaling intra prediction mode information are used in combination, signaling for this may be necessary.

According to an embodiment, a method of determining an intra prediction mode may be signaled explicitly. For example, an intra prediction mode determination method may be signaled for each block. Alternatively, whether a plurality of methods are available for each first region may be signaled, and a method of determining an intra prediction mode used for each second region may be signaled. For example, the first region may be an upper level region including a plurality of second regions. The first region may be a picture (or tile/slice), and the second region may be a coding unit or block split for coding.

According to another embodiment, a method of determining an intra prediction mode may be signaled implicitly. For example, the encoder and decoder may select a method of determining an intra prediction mode based on a preset method. Specifically, when the change amount between neighboring samples of the current block is greater than or equal to a preset value, a method based on the above-described reference sample may be used, and if it is less than a preset value, an existing method may be used.

Figure 26:
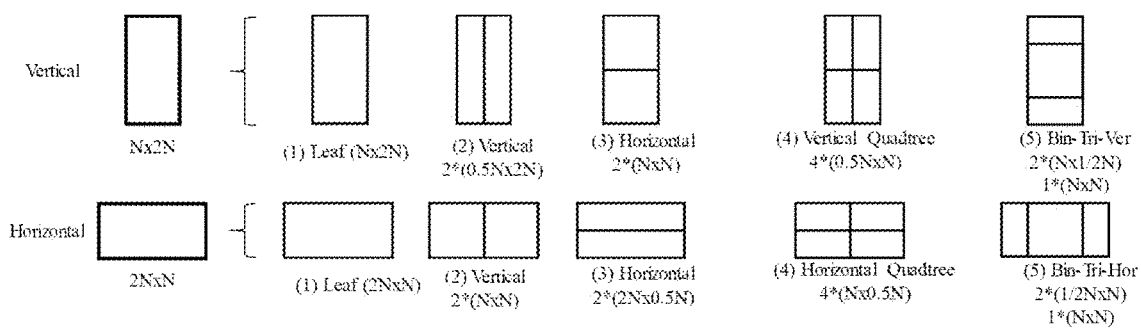
FIG. 26 is a diagram illustrating an embodiment of a method in which a vertical block and a horizontal block are divided.

Hereinafter, a method of splitting a coding tree unit into coding units according to another embodiment of the present invention will be described. FIG. 26 is a diagram illustrating an embodiment of a method in which a vertical block and a horizontal block are split. Binary blocks split by a binary partition from leaf nodes of a quad tree may be split into vertical blocks and horizontal blocks. Blocks in which the length of the vertical side is longer than the length of the horizontal side, such as an N×2N block size, may be referred to as a vertical block. The vertical block may be generated by vertical binary split from the leaf node of the quad tree.

If the vertical block is a leaf node, the vertical block may no longer be further split. Or, the vertical block may be further split according to specific conditions. Certain conditions may include the parameters described above in relation to the multi-type tree. The vertical block may be split into two (N/2)×2N nodes by vertical binary split. Or, the vertical block may be split into two N×N nodes by horizontal binary split. Or, the vertical block may be split into four (N/2)×N nodes by binary quadtree (BQ) split. Alternatively, the vertical block may be split into two N×(N/2) nodes and one N×N node by horizontal ternary split. Or, the vertical block may be split into two (N/4)×2N) nodes and one (N/2)×2N node by vertical ternary split.

Also, a block in which the length of the horizontal side is longer than the length of the vertical side, such as 2N×N block size, may be referred to as a horizontal block. The horizontal block may be generated by horizontal binary split from the leaf node of the quad tree. When the horizontal block is a leaf node, the horizontal block may not be further split. Or, the horizontal block may be further split according to specific conditions. Certain conditions may include the parameters described above in relation to the multi-type tree. The horizontal block may be split into two N×N nodes by vertical binary split. Or, the vertical block may be split into two 2N×(N/2) nodes by horizontal binary split. Or, the vertical block may be split into four N×(N/2) nodes by binary quadtree (BQ) split. Alternatively, the horizontal block may be split into two (N/2)×N nodes and one N×N node by vertical ternary split. Alternatively, the horizontal block may be split into two 2N×(N/4) nodes and one 2N×(N/2) node by vertical ternary split.

According to an embodiment of the present invention, binary quadtree split may be performed according to preset conditions. For example, whether a binary block may be BQ split may be determined in units of each picture, slice, tile, CTU, or CU. The encoder may signal whether to allow BQ a split of a binary block in units of pictures, slices, tiles, CTUs, or CUs. When binary quadtree split is allowed, the BQ split signaling field for the current block may be signaled. According to another embodiment, when a binary block is BQ-split, the corresponding split may be a final split without further split. In addition, the split blocks may indicate units to be encoded. In addition, the split blocks may represent transformed units. That is, the performance of prediction, and the like is performed integrally in the block before the BQ block split, and in a block split by BQ, it may be a unit in which transformation is performed for each block. The BQ a split of the binary block may be limited to the case where the size of one side of the binary block is MinBtSize. Only when the size of the shorter side of the binary block is MinBtSize, a signaling field for BQ block split may be signaled additionally. Further, the ternary a split of the binary block may be determined based on separate parameters related to the ternary split. For example, a separate parameter may be MaxTtSize described above.

Figure 27:
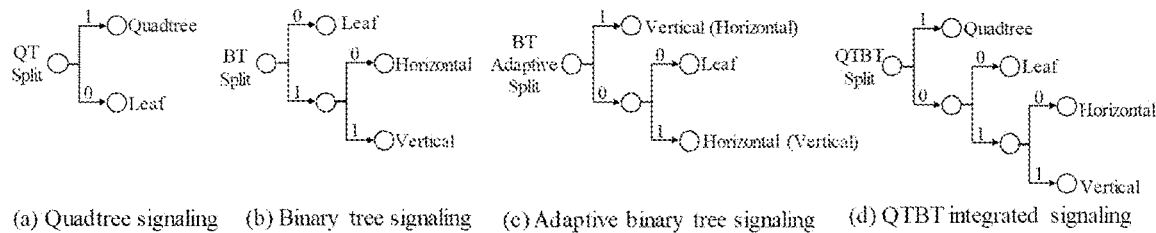
FIG. 27 is a diagram illustrating an embodiment of a method of signaling a split of a quad tree, binary tree and ternary tree.
Figure 27:
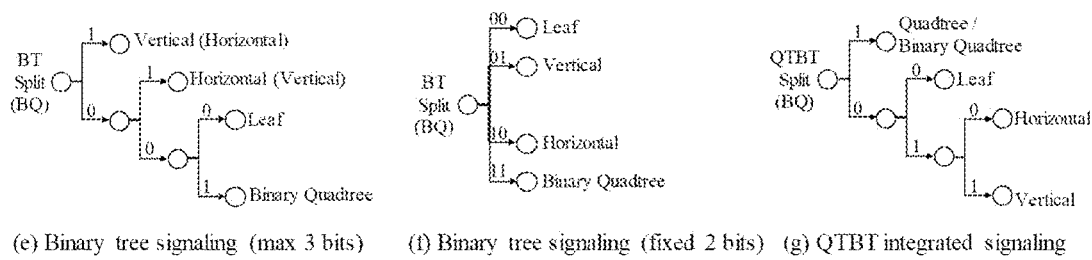

FIG. 27 is a diagram illustrating an embodiment of a method of signaling a split of a quad tree, binary tree and ternary tree. FIG. 27(a) shows an embodiment of a method in which a split of a quad tree is signaled. When QT Split indicates a split, the corresponding node may be split into quad tree nodes, and if not indicating split, the corresponding node may be a leaf node. In this case, when the quad tree is signaled as a leaf node, binary tree split information may be additionally signaled.

FIG. 27(b) shows an embodiment of a method in which a split of a binary tree is signaled. If the BT Split does not indicate a split, the corresponding node becomes a leaf node, and when the split is indicated, signaling indicating a vertical split or a horizontal split may be added.

FIG. 27(c) illustrates a method of splitting a binary tree according to another embodiment of the present invention. When BT Adaptive Split is 1, the node may be split by either a vertical binary split or a horizontal binary split. If BT Adaptive Split is 0, the node may be a leaf node, or split by one of a vertical binary split or a horizontal binary split. Signaling indicating whether it is a leaf node or a binary split may be added. The encoder may preferentially signal a binary split in one direction among binary splits. Through this, when a large number of splits are selected from the entire picture, slice, tile, or CTU unit, signaling overhead may be reduced.

The adaptive signaling method of FIG. 27(c) may be used or signaled adaptively through the following method. For example, the adaptive signaling method may be used when the maximum BT depth MaxBTDepth indicating the maximum number of BT splits allowed is greater than a preset value. This is because, when MaxBTDepth is large, signaling for binary tree split is frequently generated, so that the effect of adaptive signaling may occur. On the other hand, when MaxBTDepth is small, it is difficult to obtain the effect of adaptive signaling because the number of signaling for the binary tree split is small. Accordingly, when MaxBT-Depth is smaller than a preset value, the signaling method of FIG. 27(b) may be used.

In addition, the encoder may signal information related to an adaptive signaling method on a picture (or tile/slice) basis. Specifically, the encoder may signal a split direction preferentially signaled by BT Adaptive Split among vertical binary splits and horizontal binary splits. In addition, the split direction preferentially signaled by the BT Adaptive Split may be changed based on context in a picture (or tile/slice) unit. For example, a split direction preferentially signaled may be determined based on the frequency of vertical binary splits and horizontal binary splits up to the previous block of the current block.

Also, in the case of an I-slice in which all blocks are encoded in intra prediction mode, based on the split structure of the luma block corresponding to the chroma block, adaptive signaling for the chroma block split may be performed. The luma block corresponding to the chroma block may be selected based on the block corresponding to the position of the pixel in the center of the chroma block. Alternatively, a luma block corresponding to pixels of various parts such as an upper left, upper right, center, lower left, or lower right of the chroma block may be selected. Using a split structure of one or more luma blocks corresponding to the chroma blocks, a method of signaling a split of a chroma block may be changed. For example, when the luma block is a vertical block, a signaling method in which the vertical binary split is signaled preferentially in relation to the a split of the chroma block may be selected.

FIG. 27(d) shows an embodiment of a method for signaling a QTBT combining block split structure. If QTBT Split is 1, the corresponding node may be split by a quad tree, and if 0, the node may be a leaf node or split by a binary tree. Also, signaling indicating whether it is a leaf node or split by a binary tree may be added. In addition, when indicating it is split by a binary tree, signaling indicating whether it is a vertical binary split or a horizontal binary split may be added.

FIG. 27(e) shows an embodiment of a method in which a split of a binary tree is signaled when BQ split is allowed. As shown in FIG. 27(c), one of the horizontal binary split and the vertical binary split may be signaled first. In addition, the other one of the horizontal binary split and the vertical binary split is signaled, and whether a leaf node or a BQ split may be signaled.

FIG. 27(f) shows another embodiment of a method in which a split of a binary tree is signaled when BQ split is allowed. The split of the binary tree may be signaled through a fixed length coding method. Signaling indicating leaf nodes, horizontal binary splits, vertical binary splits, and BQ splits may be performed, respectively. Efficient signaling may be performed when the probability of occurrence of each leaf node, horizontal binary split, vertical binary split, and BQ split is similar.

FIG. 27(g) shows an embodiment of a method in which a QTBT combining block split is signaled when BQ split is allowed. In FIG. 27(g), the current tree structure may be signaled regardless of whether it is a quad tree or a binary tree.

Figure 28:
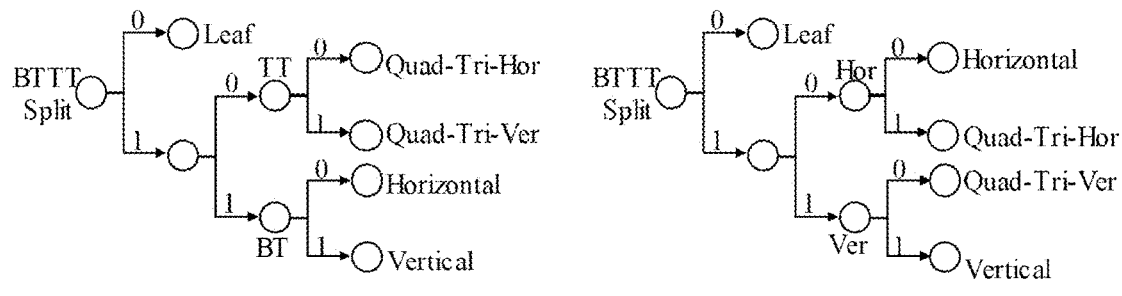
FIG. 28 is a diagram showing an embodiment of a method of signaling a split of a ternary tree.
Figure 28:
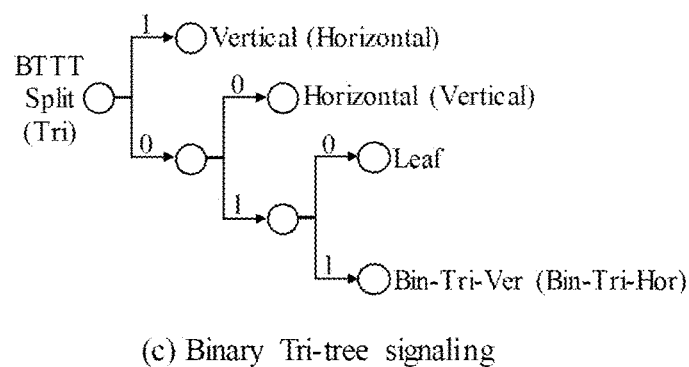

FIG. 28 is a diagram showing an embodiment of a method of signaling a split of a ternary tree. Referring to FIG. 28(a), when BTTT Split is 0, the corresponding node may be a leaf node. In addition, when BTTT Split is 1, the corresponding node may be a binary tree split or a ternary tree split. The bit indicating whether it is a binary tree split or a ternary tree split and a bit indicating whether it is a horizontal split or a vertical split in each case may be additionally signaled.

Referring to FIG. 28(b), the split direction may be signaled in preference to the split shape. Whether it is the horizontal split or the vertical split may be signaled preferentially compared to whether it is the binary tree or the ternary tree. If BTTT Split is 0, the node becomes a leaf node, and if 1, the node may be split by either a horizontal split or a vertical split. In this case, a bit signaling a horizontal split or a vertical split and a bit signaling a binary tree or ternary tree may be additionally signaled.

Meanwhile, whether the ternary tree split is allowed may be determined in units of pictures, slices, tiles, or CTUs. For example, when a preset condition is established in units of pictures, slices, tiles, or CTUs, a ternary tree split may be allowed. Alternatively, the encoder may signal whether ternary tree split is allowed in a picture, slice, tile, or CTU unit. When the ternary tree split is not allowed, the signaling method of FIG. 28(b) may reduce the signaling overhead by 1 bit compared to the signaling method of FIG. 28(a). The signaling method of FIG. 28(b) may signal a binary tree split with a maximum of 2 bits when ternary tree split is not allowed.

Referring to FIG. 28(c), the corresponding node may be a leaf node or split into a plurality of nodes by a vertical binary split, a horizontal binary split, a vertical ternary split, or a horizontal ternary split according to the binary tree structure. According to an embodiment, the encoder may preferentially signal either a vertical binary split or a horizontal binary split, and then signal the remaining split structure. Even in this case, the adaptive signaling method described through FIG. 27(c) may be applied in the same or corresponding manner.

Figure 29:
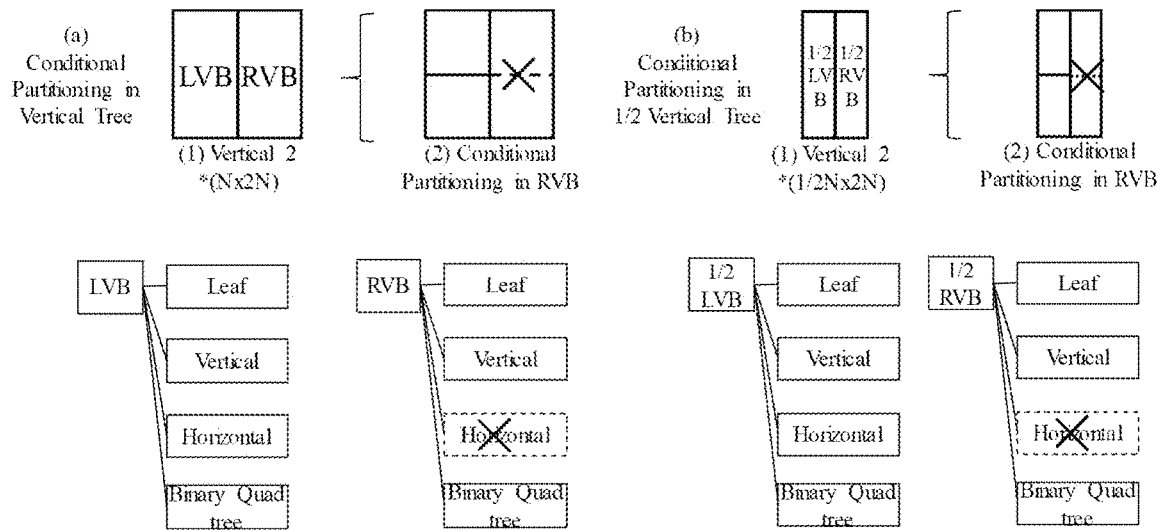
FIG. 29 is a diagram specifically showing a structure in which a vertical block is split according to an embodiment of the present invention.

FIG. 29 is a diagram specifically showing a structure in which a vertical block is split according to an embodiment of the present invention. Referring to FIG. 29(a), a block of 2N×2N size may be split into a first left vertical block LVB and a first right vertical block RVB of N×2N size by vertical binary split. In this case, the split structure of the first right vertical block may be limited according to the split structure of the first left vertical block. For example, when the first left vertical block is horizontal binary split, the first right vertical block may not allow horizontal binary split. This is because when the first left vertical block and the first right vertical block are split by horizontal binary split, it is the same as when a block of 2N×2N size is split into a quad tree structure. In addition, this is because it is possible to signal in a quad tree split in 2N×2N block. Accordingly, when the horizontal binary split for the first left vertical block is signaled, the split of the first right vertical block may be signaled except for the horizontal binary split.

Referring to FIG. 29(b), a vertical block of N×2N may be split into a second left vertical block and a second right vertical block of a (N/2)×2N size by vertical binary split. In this case, the split structure of the second right vertical block may be limited according to the split structure of the second left vertical block. For example, when the second left vertical block is horizontal binary split, the second right vertical block may not allow horizontal binary split. This is because when the second left vertical block and the second right vertical block are split by horizontal binary split, it is the same as when a block of an N×2N size is split by binary quad split. In addition, this is because it is possible to signal in the BQ split from the N×2N node. Accordingly, when the horizontal binary split for the second left vertical block is signaled, the split of the second right vertical block may be signaled except for the horizontal binary split.

Figure 30:
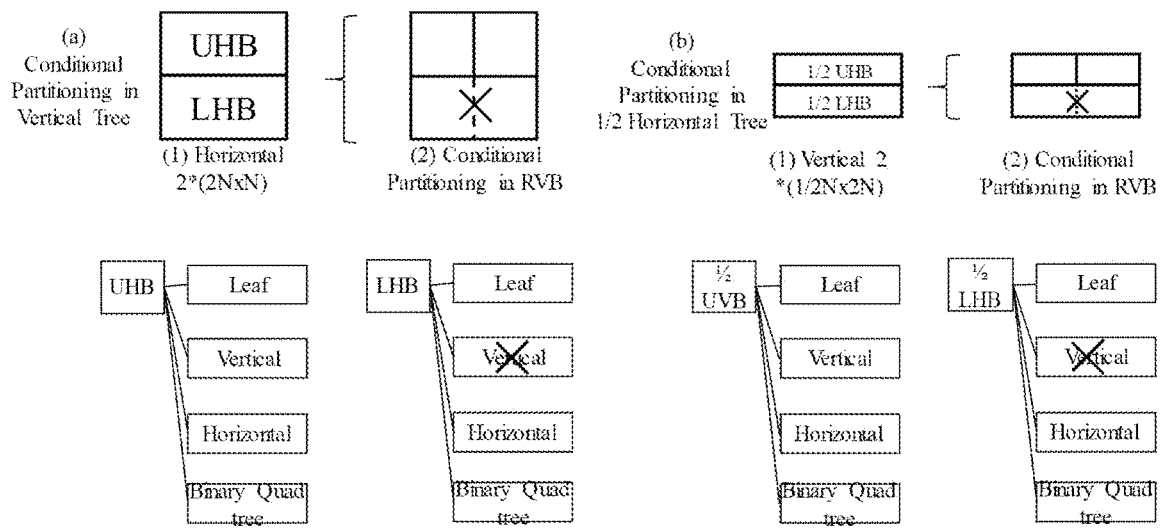
FIG. 30 is a diagram specifically showing a structure in which a horizontal block is split according to an embodiment of the present invention.

FIG. 30 is a diagram specifically showing a structure in which a horizontal block is split according to an embodiment of the present invention. Referring to FIG. 30(a), a block of 2N×2N size may be split into a first upper horizontal block UHB and a first lower horizontal block LHB of 2N×N size by horizontal binary split. In this case, the split structure of the first lower horizontal block may be limited according to the split structure of the first upper horizontal block. For example, if the first upper horizontal block is vertically binary split, a horizontal binary split may not be allowed in the first lower horizontal block. This is because when the first upper horizontal block and the first lower horizontal block are split by vertical binary split, it is the same as when a block of 2N×2N size is split into a quad tree structure. In addition, this is because it is possible to signal in a quad tree split in a 2N×2N block. Accordingly, when the vertical binary split for the first upper horizontal block is signaled, the split of the first lower horizontal block may be signaled except for the vertical binary split.

Referring to FIG. 30(b), a horizontal block of 2N×N may be split into a second upper horizontal block and a second lower horizontal block of 2N×(N/2) size by horizontal binary split. In this case, the split structure of the second lower horizontal block may be limited according to the split structure of the second upper horizontal block. In this case, the split structure of the second lower horizontal block may be limited according to the split structure of the second upper horizontal block. This is because when the second upper horizontal block and the second lower horizontal block are split by horizontal binary split, it is the same as when a block of 2N×N size is split by binary quad split. In addition, this is because it is possible to signal in the BQ split from the 2N×N node. Accordingly, when the vertical binary split for the second upper horizontal block is signaled, the split of the second lower horizontal block may be signaled except for the vertical binary split.

As described above with reference to FIGS. 29 and 30, according to an embodiment of the present invention, the type of split signaling of the current block may be limited based on split information of neighboring blocks. Through this, split information of a coding tree unit or a coding unit may be efficiently signaled.

Figure 31:
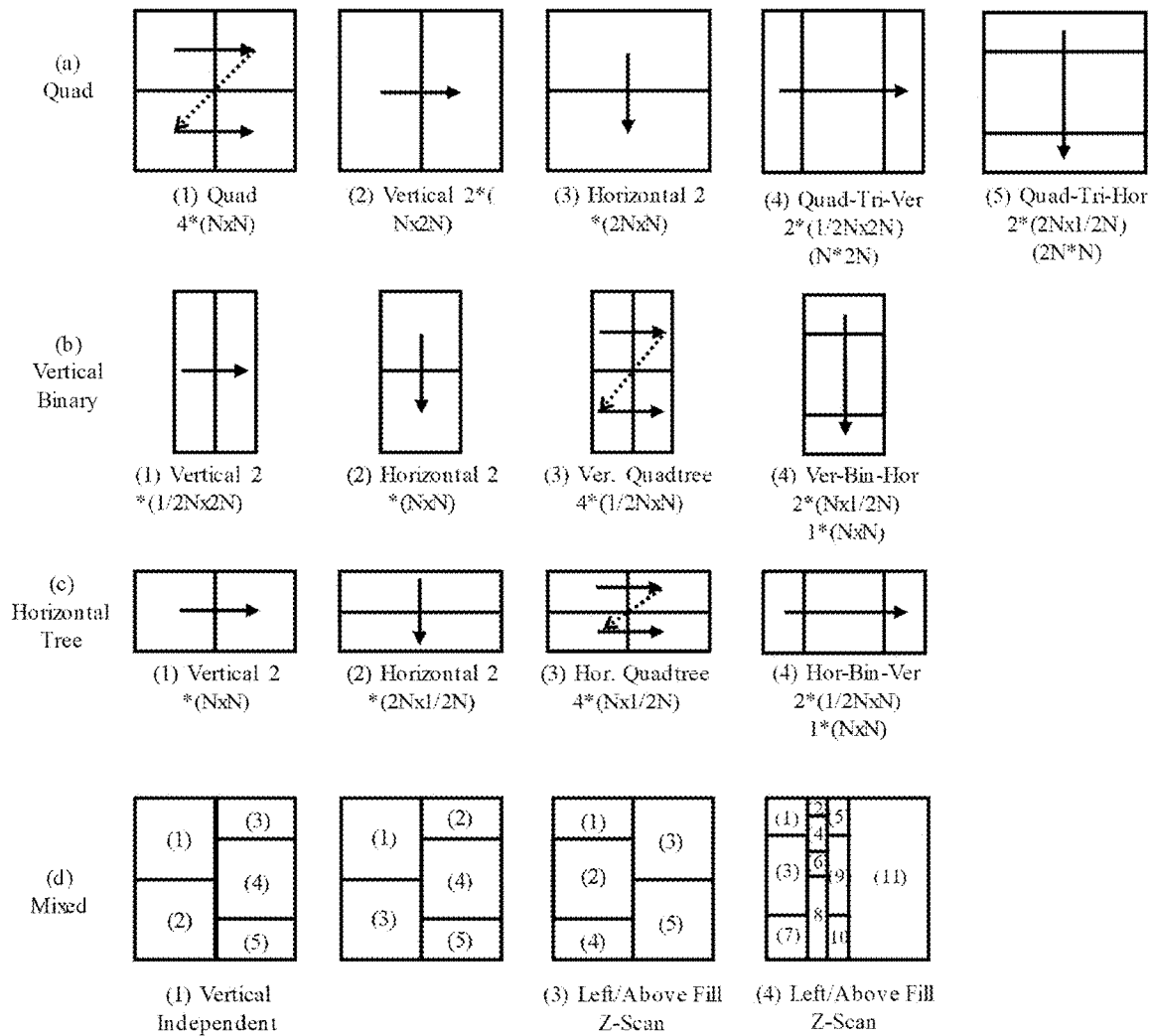
FIG. 31 is a diagram showing an embodiment of a method for determining a block scan order.

FIG. 31 is a diagram showing an embodiment of a method for determining a block scan order. FIG. 31(a) shows embodiments of an order of scanning a plurality of nodes split from a node of 2N×2N size. Here, a node of 2N×2N size may include a CTU. The encoder and decoder can use the same scan order with each other according to predefined rules. For example, when the corresponding node is split into four nodes by a quad tree split ((a)(1)), encoding and decoding of four blocks may be performed according to the Z scan order as shown in FIG. 31(a).

The node may be split into a plurality of blocks by binary split or ternary split. As shown in FIG. 31(a), when the corresponding node is split in the vertical direction ((a)(2), (4)), a plurality of blocks may be sequentially encoded and decoded from left to right (horizontal direction). Further, when the corresponding node is split in the horizontal direction ((a)(3), (5)), a plurality of nodes may be sequentially encoded and decoded from the top to the bottom (vertical direction).

FIG. 31(b) shows embodiments of an order for scanning a plurality of blocks split from a vertical block. As shown in (3) of FIG. 31(b), when a vertical block is split by a BQ split, encoding and decoding of four blocks may be performed according to a Z scan order. When the vertical block is split in the vertical direction ((b)(1)), a plurality of blocks may be sequentially encoded and decoded from left to right (horizontal direction). Further, when the vertical block is split in the horizontal direction ((b)(2), (4)), a plurality of nodes may be sequentially encoded and decoded from the top to the bottom (vertical direction).

FIG. 31(c) shows embodiments of an order for scanning a plurality of blocks split from a horizontal block. As shown in (3) of FIG. 31(c), when a vertical block is split by a BQ split, encoding and decoding of four blocks may be performed according to a Z scan order. When the horizontal block is split in the vertical direction ((c)(1), (4)), a plurality of blocks may be sequentially encoded and decoded from left to right (horizontal direction). Further, when the horizontal block is split in the horizontal direction ((c)(2)), a plurality of nodes may be sequentially encoded and decoded from the top to the bottom (vertical direction).

FIG. 31(d) is a diagram illustrating embodiments of a scan order for scanning blocks that are split in various ways. Referring to (1) of FIG. 31(d), a block of 2N×2N size is split into two vertical blocks, and each of the vertical blocks may be split by a horizontal binary split and a horizontal ternary split. According to an embodiment, the encoder and the decoder scan vertical blocks in left-to-right order, but in a vertical block, a scan order may be used for scanning from top to bottom. Accordingly, the encoder and decoder may scan in the order of the upper node of the left vertical block, the lower node of the left vertical block, the upper node of the right vertical block, the middle node of the right vertical block, and the lower node of the right vertical block.

According to another embodiment, a method of maintaining a Z scan order may be used. For example, the encoder and decoder may perform a Z scan from the upper left block of the picture, but use a method of scanning a specific block only when an adjacent block to the left of the specific block is restored. Specifically, (2) to (4) of FIG. 31(d) show a scan order based on a Z scan.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device comprising a processor, wherein the processor is configured to:
determine whether a coding tree block is divided into a plurality of blocks,
determine whether an upper boundary of a current block is adjacent to an upper boundary of the coding tree block,
wherein, when the coding tree block is divided, the coding tree block is divided in at least one of a horizontal direction and a vertical direction, and the current block is any one of the plurality of blocks,
wherein, when the coding tree block is not divided, the current block is the coding tree block,
determine a first intra prediction mode for prediction of the current block based on whether the upper boundary of the current block is adjacent to the upper boundary of the coding tree block,
reconstruct the current block based on the first intra prediction mode,
wherein the first intra prediction mode is one of prediction modes included in a first intra prediction mode set or a second intra prediction mode set,
wherein the first intra prediction mode set includes a plurality of angular modes, a planar mode, and a DC mode,
wherein the second intra prediction mode set includes a part of a plurality of prediction modes included in the first intra prediction mode set,
wherein the second intra prediction mode set includes a predefined number of angular modes determined based on an intra prediction mode corresponding to at least one of neighboring blocks of the current block.

2. The video signal decoding device of claim 1,
when the upper boundary of the current block is not adjacent to the upper boundary of the coding tree block,
wherein the first intra prediction mode is one of the prediction modes included in the first intra prediction mode set or the second intra prediction mode set.

3. The video signal decoding device of claim 1,
when the upper boundary of the current block is adjacent to the upper boundary of the coding tree block,
wherein the first intra prediction mode is one of the prediction modes included in the first intra prediction mode set.

4. The video signal decoding device of claim 1,
wherein the second intra prediction mode set includes at least one of the plurality of angular modes and/or the DC mode, and the second intra prediction mode set does not include the planar mode.

5. The video signal decoding device of claim 4,
wherein the processor is configured to:
obtain intra prediction mode information indicating the DC mode or any one of the predefined number of the angular modes included in the second intra prediction mode set,
wherein the first intra prediction mode is determined based on the intra prediction mode information.

6. A video signal encoding device comprising a processor, wherein the processor is configured to
obtain a bitstream to be decoded by a decoder using a decoding method,
wherein the decoding method comprising:
determining whether a coding tree block is divided into a plurality of blocks;
determining whether an upper boundary of a current block is adjacent to an upper boundary of the coding tree block,
wherein, when the coding tree block is divided, the coding tree block is divided in at least one of a horizontal direction and a vertical direction, and the current block is any one of the plurality of blocks,
wherein, when the coding tree block is not divided, the current block is the coding tree block,
determining a first intra prediction mode for prediction of the current block based on whether the upper boundary of the current block is adjacent to the upper boundary of the coding tree block,
reconstructing the current block based on the first intra prediction mode,
wherein the first intra prediction mode is one of prediction modes included in a first intra prediction mode set or a second intra prediction mode set,
wherein the first intra prediction mode set includes a plurality of angular modes, a planar mode, and a DC mode,
wherein the second intra prediction mode set includes a part of a plurality of prediction modes included in the first intra prediction mode set,
wherein the second intra prediction mode set includes a predefined number of angular modes determined based on an intra prediction mode corresponding to at least one of neighboring blocks of the current block.

7. The video signal encoding device of claim 6,
when the upper boundary of the current block is not adjacent to the upper boundary of the coding tree block,
wherein the first intra prediction mode is one of the prediction modes included in the first intra prediction mode set or the second intra prediction mode set.

8. The video signal encoding device of claim 6,
when the upper boundary of the current block is adjacent to the upper boundary of the coding tree block,
wherein the first intra prediction mode is one of the prediction modes included in the first intra prediction mode set.

9. The video signal encoding device of claim 6,
wherein the second intra prediction mode set includes at least one of the plurality of angular modes and/or the DC mode, and the second intra prediction mode set does not include the planar mode.

10. The video signal encoding device of claim 9,
wherein the decoding method further comprising:
obtaining intra prediction mode information indicating the DC mode or any one of the predefined number of the angular modes included in the second intra prediction mode set,
wherein the first intra prediction mode is determined based on the intra prediction mode information.

11. A non-transitory computer-readable medium storing a bitstream, the bitstream being decoded by a decoding method,
wherein the decoding method, comprising:
determining whether a coding tree block is divided into a plurality of blocks;
determining whether an upper boundary of a current block is adjacent to an upper boundary of the coding tree block,
wherein, when the coding tree block is divided, the coding tree block is divided in at least one of a horizontal direction and a vertical direction, and the current block is any one of the plurality of blocks,
wherein, when the coding tree block is not divided, the current block is the coding tree block,
determining a first intra prediction mode for prediction of the current block based on whether the upper boundary of the current block is adjacent to the upper boundary of the coding tree block,
reconstructing the current block based on the first intra prediction mode,
wherein the first intra prediction mode is one of prediction modes included in a first intra prediction mode set or a second intra prediction mode set,
wherein the first intra prediction mode set includes a plurality of angular modes, a planar mode, and a DC mode,
wherein the second intra prediction mode set includes a part of a plurality of prediction modes included in the first intra prediction mode set,
wherein the second intra prediction mode set includes a predefined number of angular modes determined based on an intra prediction mode corresponding to at least one of neighboring blocks of the current block.

12. The non-transitory computer-readable medium storing the bitstream of claim 11,
when the upper boundary of the current block is not adjacent to the upper boundary of the coding tree block,
wherein the first intra prediction mode is one of the prediction modes included in the first intra prediction mode set or the second intra prediction mode set.

13. The non-transitory computer-readable medium storing the bitstream of claim 11,
when the upper boundary of the current block is adjacent to the upper boundary of the coding tree block,
wherein the first intra prediction mode is one of the prediction modes included in the first intra prediction mode set.

14. The non-transitory computer-readable medium storing the bitstream of claim 11,
wherein the second intra prediction mode set includes at least one of the plurality of angular modes and/or the DC mode, and the second intra prediction mode set does not include the planar mode.

15. The non-transitory computer-readable medium storing the bitstream of claim 14,
wherein the decoding method further comprising:
obtaining intra prediction mode information indicating the DC mode or any one of the predefined number of the angular modes included in the second intra prediction mode set,
wherein the first intra prediction mode is determined based on the intra prediction mode information.

* * * * *